(12) United States Patent
Campagna

(10) Patent No.: US 9,705,859 B2
(45) Date of Patent: Jul. 11, 2017

(54) KEY EXCHANGE THROUGH PARTIALLY TRUSTED THIRD PARTY

(71) Applicant: Amazon Technologies, Inc., Seattle, WA (US)

(72) Inventor: Matthew John Campagna, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 18 days.

(21) Appl. No.: 14/967,214

(22) Filed: Dec. 11, 2015

(65) Prior Publication Data

US 2017/0171174 A1  Jun. 15, 2017

(51) Int. Cl.
*H04L 29/06* (2006.01)

(52) U.S. Cl.
CPC ........ *H04L 63/062* (2013.01); *H04L 63/0442* (2013.01); *H04L 63/061* (2013.01); *H04L 63/0876* (2013.01); *H04L 63/166* (2013.01)

(58) Field of Classification Search
CPC .................................................... H04L 63/062
See application file for complete search history.

(56) References Cited

U.S. PATENT DOCUMENTS

| 5,511,121 | A | * | 4/1996 | Yacobi | G06Q 20/02 380/30 |
| 6,775,772 | B1 | * | 8/2004 | Binding | H04L 63/0428 380/279 |
| 6,931,528 | B1 | | 8/2005 | Immonen | |
| 7,624,280 | B2 | * | 11/2009 | Oskari | G06F 21/35 713/169 |
| 8,996,873 | B1 | | 3/2015 | Pahl et al. | |

(Continued)

OTHER PUBLICATIONS

Franklin et al.; Fair exchange with a semi-trusted third party; Published in Proceeding CCS '97 Proceedings of the 4th ACM conference on Computer and communications security; pp. 1-5; Zurich, Switzerland—Apr. 1-4, 1997; ACM Digital Library.*

(Continued)

*Primary Examiner* — Bradley Holder
(74) *Attorney, Agent, or Firm* — David Wright Tremaine LLP

(57) ABSTRACT

Clients within a computing environment may establish a secure communication session. Sometimes, a client may trust a cryptography service to perform some cryptographic operations and access some cryptographic resources while simultaneously not trusting the cryptography service to perform other operations and access other resources. Two or more clients may utilize a cryptography service to perform certain authentication and verification operations to establish a secure communication session, while simultaneously denying the cryptography service access to the secure communication session.

20 Claims, 15 Drawing Sheets

(56) References Cited

U.S. PATENT DOCUMENTS

| | | | | |
|---|---|---|---|---|
| 9,420,458 | B2* | 8/2016 | Putze | H04L 63/0823 |
| 2001/0044898 | A1* | 11/2001 | Benussi | H04L 41/5054 |
| | | | | 713/173 |
| 2002/0087862 | A1* | 7/2002 | Jain | H04L 9/3247 |
| | | | | 713/176 |
| 2004/0171369 | A1* | 9/2004 | Little | G06Q 10/107 |
| | | | | 455/410 |
| 2005/0149442 | A1* | 7/2005 | Adams | H04L 63/0823 |
| | | | | 705/51 |
| 2008/0301445 | A1* | 12/2008 | Vasic | G06F 17/30067 |
| | | | | 713/171 |
| 2009/0103471 | A1* | 4/2009 | Candelore | H04N 21/43632 |
| | | | | 370/315 |
| 2011/0055585 | A1* | 3/2011 | Lee | H04L 9/0844 |
| | | | | 713/183 |
| 2013/0111209 | A1* | 5/2013 | Harkins | H04L 9/321 |
| | | | | 713/171 |
| 2014/0140507 | A1* | 5/2014 | Park | H04W 8/245 |
| | | | | 380/247 |
| 2015/0012339 | A1* | 1/2015 | Onischuk | G07C 13/00 |
| | | | | 705/12 |
| 2015/0381618 | A1* | 12/2015 | Lin | H04L 63/0869 |
| | | | | 713/169 |
| 2016/0365984 | A1* | 12/2016 | Lee | H04L 9/3247 |

OTHER PUBLICATIONS

Ezhilchelvan et al.; A family of trusted third party based fair-exchange protocols; Published in: IEEE Transactions on Dependable and Secure Computing ( Vol. 2, Issue: 4, Oct.-Dec. 2005 ); pp. 273-286; Date of Publication: Nov. 21, 2005; IEEE Xplore.*

Dierks et al., "The Transport Layer Security (TLS) Protocol Version 1.2," Request for Comments: 5246, Standards Track, Aug. 2008, 104 pages.

Housley, "Using AES-CCM and AES-GCM Authenticated Encryption in the Cryptographic Message Syntax (CMS)," Request for Comments: 5084, Standards Track, Nov. 2007, 11 pages.

International Search Report and Written Opinion mailed Mar. 28, 2017, International Patent Application No. PCT/ US2016/065207, filed Dec. 6, 2016.

Menezes et al., "Handbook of Applied Cryptography, Key Management Techniques," Chapter 13, CRC Press, Jan. 1, 1997, 49 pages.

Menezes et al., "This is a Chapter from the Handbook of Applied Cryptography, by a A Key Establishment Protocols," CRC Press, Dec. 31, 1997, 54 pages.

* cited by examiner

KEY EXCHANGE THROUGH PARTIALLY TRUSTED THIRD PARTY

CROSS REFERENCE TO RELATED APPLICATION

This application incorporates by reference for all purposes the full disclosure of U.S. patent application Ser. No. 14/967, 142, filed concurrently herewith, entitled "SIGNED ENVELOPE ENCRYPTION".

BACKGROUND

The security of computing resources and associated data is of high importance in many contexts. As an example, networks of computing devices may be utilized to provide a robust set of services to their users. Within a network, a first computer, system, or user may trust a second computer, system, or user—that is, the computer, system, or user may be privileged with certain access rights such as the ability to create, read, update, and/or delete data of the first computer, system, or user. The second computer, system, or user may also be trusted to store data associated with the first computer, system, or user. As an example, a first computer, system, or user may trust a certificate authority with storing an public key and signing a digital certificate that certifies ownership of the public key. Conversely, there may be other computers, systems, or users that are untrusted and do not have the access rights or privileges of a trusted computer, system, or user. Additionally, there may exist a partially trusted computer, system, or user that has some access rights or privileges associated with a trusted computer, system, or user. With such configurations of computing resources, ensuring that access to the resources and the data is managed correctly can be challenging, especially as the size and complexity of such configurations grow.

Modern cryptographic algorithms provide high levels of data security. Current encryption methods, for example, can secure data such that unauthorized access to the data requires an impractical amount of time and/or resources. Such high-levels of protection, however, come at a cost. Generally speaking, higher levels of protection require greater levels of care and greater expenditures of computational resources. Furthermore, higher levels of protection may also require greater levels of trust in one or more subcomponents—for example, in a cryptography service or a certificate authority. Ensuring cryptographically protected communication between two or more parties may be difficult, especially in systems where it may be advantageous to reduce the use of computational resources or limit the amount of trust granted to various subcomponents of a network.

BRIEF DESCRIPTION OF THE DRAWINGS

Various techniques will be described with reference to the drawings, in which.

DETAILED DESCRIPTION

Figure 1:
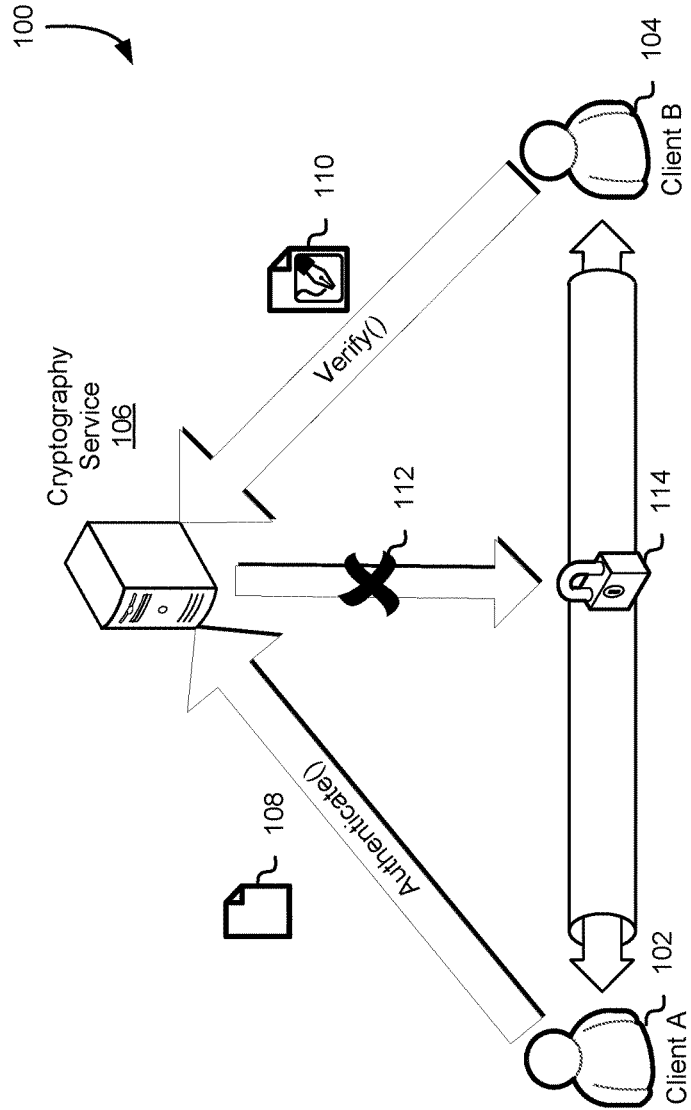
FIG. 1 illustrates an environment in which a cryptographically protected communication session is established using a partially trusted cryptography service.

Techniques described this document involve the use of partially trusted computer systems to facilitate cryptographically protected communications. In some examples, a first computer system communicates with a second computer system using a partially trusted cryptography service. A partially trusted system (e.g., a cryptography service) may be a computer system that is trusted in some respects but not trusted in other respects. For example, a partially trusted cryptography service may be trusted to generate digital signatures and verify the authenticity of digital signatures, but not trusted with access to a digital key that can be used to access a cryptographically protected communication between the first computer system and the second computer system. In such a system, the partially trusted cryptography service may be used, at least in part, during the handshake process establishing a cryptographically protected communication session between the first computer system with the second computer system, and not have access to the established cryptographically protected communication session. For example, a partially secure cryptography service may be used, at least in part, to establish a Transport Layer Security (TLS) session between a client computer and a server which cannot be decrypted by the cryptography service.

In another example, a first computer system sends a cryptographically protected communication to a second computer system that is encrypted by a cryptographic data key and where the data key is accessible by the second computer system. The data contained in the cryptographically protected communication may be protected such that the second computer system may read the data, but cannot modify the data in a manner that a third party would not be able to verify. That is, any modification of the data by the cryptographically protected communication can be detected by a third party. In such a system, a first computer system may provide a cryptographically protected communication to second computer system via an untrusted "middleman" computer system and the second computer system may verify whether the message was modified by the "middleman" computer system.

As an example, two computer systems establish a cryptographically protected communication session where a partially trusted third party is utilized to establish a trust relationship between the two computer systems but the partially trusted third party is not trusted to be a party of the cryptographically protected communication. For example, a cryptography service may serve as a partially trusted third party that is utilized to establish a TLS session between a client and a server, but the cryptography service is not able to read the contents of the encrypted communications between the client and server. Continuing with the example, the cryptography service may be trusted to generate digital signatures and to verify whether a purportedly authentic digital signature is indeed authentic. However, the cryptography service may be untrusted to store and access cryptographic private keys used in cryptographically protected communications (e.g., TLS sessions) between the client and the server. There can be various reasons that a cryptography service may be trusted in some respects (e.g., generating and verifying digital signatures) and untrusted in other respects (e.g., storing private keys)—the communications between the client and server may be of a particularly sensitive nature (e.g., important business, government, and/or military data), the cryptography service may have a hardware configuration that is not capable of supporting a full range of cryptographic services (e.g., the cryptography service may not support cryptographic keys of a length that is satisfactory for the session), and so on and so forth.

In one example, two clients may use a partially trusted cryptography service to perform a key exchange. The first client may generate a first Elliptic curve Diffie-Hellman (ECDH) key pair, $d_A$ and $Q_A$, and generate a message containing the first client's identity and the public key $Q_A$. The first client's identity may be encoded, for example, as a user ID, a GUID, a machine ID, media access control address (MAC address), or the like. Additionally, dynamic identifiers such as a dynamic IP address may be used to identify the first client. The first client may provide the message containing the first client's identity and the public key to the cryptography service requesting a digital signature. The cryptography service may then digitally sign the message using a cryptographic key associated with the first client and provide the digitally signed message back to the first client. The cryptography service may have a store of cryptographic keys where each client of the cryptography service is assigned a unique cryptographic key. The cryptography service may copy the digitally signed message. Upon receiving the digitally signed message, the first client may provide the digitally signed message to a second client. This may occur as part of a handshake protocol. The second client, upon receiving the digitally signed message, may verify the authenticity of the digitally signed message by providing it to the cryptography service with a request to authenticate. In some cases, the digital signature may be determined to be unauthentic—that is, that either the message and/or signature was modified. This may be a result of unintentional or intentional modifications to the message. An unintentional modification may arise from wireless signal loss, packet loss, data corruption, memory corruption, and the like. An intentional modification may arise from a malicious party obtaining the message (e.g., at a router during transmission) and modifying the message. If the message is determined to be unauthentic, the second client may reject the first message, and the handshake may fail.

However, if the message of the preceding paragraph is determined to be authentic, the second client may extract the first client's identity and associate the public key $Q_A$ to the first client. The second client may then generate a second ECDH key pair $d_B$ and $Q_B$, and generate a second message containing the second client's identity and the public key $Q_B$. This second message may be digitally signed, transmitted, and verified in a similar manner to the first message. Upon receiving the second message and verifying its authenticity, the first client may associate the public key $Q_B$ to the second client. After exchanging public keys, the first and second client can compute a shared secret—the first client computes the elliptic curve point multiplication of $d_A Q_B$ and the second client computes the elliptic curve point multiplication of $d_B Q_A$. In an elliptic curve Diffie-Hellman key exchange, the two values are equal and may be used as a key or to generate a private key that may be used to establish a cryptographically protected communication session such as a TLS session. Once established, the first client and the second client may communicate via the cryptographically protected communication session with assurances that the cryptography service does not know the shared secret, and thus does not know the private key used in the TLS session. This provides greater security assurances because the cryptography service cannot participate in the cryptographically protected communication session. The clients are assured that the cryptography service cannot compute the shared secret and eavesdrop or perform a "man-in-the-middle" attack for cryptographically protected communication sessions generated in the manner described above.

In some environments, a first computer system may send data to a second computer system using envelope encryption. In such a system, the first computer system and second computer system may both have access to a cryptographic data key. The data key may be used by the first computer system to encrypt a message that may later be decrypted by the second computer system using the data key. However, in some environments, it may be desirable to detect whether the second computer system has modified the message, and further, it may be desirable to prevent the second computer system from modifying the message without detection. It should be noticed in this example, the cryptography service may be trusted to perform different operations than those in examples above—in this example, the cryptography service may be trusted to generate a cryptographic data key, store a master key, and perform encryption and decryption operations using the master key.

Continuing with the example from the previous paragraph, a first client may have data or a message that is to be encrypted using a cryptographic data key such that a second computer system having access to the cryptographic data key cannot modify the data without the modification being detectable. The client may first request a cryptography service generate a cryptographic data key. The client may the encrypt a message using the cryptographic data key. The client may then generate a ECDH key pair $d_A$ and $Q_A$. A digital certificate of the encrypted message may be generated using $d_A$, and is cryptographically verifiable using $Q_A$. The client may then request the cryptography service to perform an authenticated encryption using the master key with the following inputs: the cryptographic data key as the plaintext to be encrypted and an additional authenticated data (AAD), which includes the ECDH public key $Q_A$. The cryptography service, in response to the request to perform authenticated encryption, generates a ciphertext of the data key using an encryption algorithm under the master key and a message authentication (MAC) tag using a cryptographic hash function. The digitally signed and encrypted message, the ciphertext of the data key, and the MAC tag are then transmitted to one or more recipients.

When a recipient receives the digitally signed and encrypted message, the ciphertext of the data key, and the MAC tag, the recipient can verify whether the message has been modified by a party other than the first client. The recipient may first extract the AAD from the MAC tag and request the cryptography service perform a decryption corresponding to the authenticated encryption above. The decryption may accept as inputs: a ciphertext and an AAD. The cryptography service may return an error if the AAD does not match the supplied ciphertext input. If the decryption operation is successful, a plaintext output and a key identifier corresponding to the cryptographic key used to decrypt the ciphertext input may be provided. If the key identifier does not correspond to the master key used in the encryption operation, an error or other indication that the message may have been modified may be returned. However, if the key identifier matches the master key, the digital signature of the encrypted data key may be verified using the public key $Q_A$. After verifying the digital signature, the plaintext output, which contains the data key, may be used to decrypt the ciphertext message. The decrypted message is assured to have been sent by the first client because of the binding of the public key used in the signature verification.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows a diagram 100 illustrating a context in which various techniques of the present disclosure may be utilized. In this particular example, the diagram 100 shows a first client "Client A" 102 and a second client "Client B" 104 communicating via a cryptographically protected communication session 114. A cryptography service 106 may be utilized by the clients 104 and 106 to perform various cryptographic operations and to store and access cryptographic keys. A message 108 may be provided (e.g., sent over a network) to the cryptography service to perform an authenticate operation and a digital signature 110 may be provided to the cryptography service 106 to perform a verification operation. The cryptography service 106 may have insufficient information to access 112 the cryptographically protected communication session 114.

In some examples, the first client 102 and or the second client 104 may be various types of computing entities. In some embodiments, the clients 102 and 104 may be respective computer systems on a network (e.g., a local area network), but may also be on different networks connected via the Internet. One or both of the clients 102 and 104 may also be computer servers, instances of a virtual machine, and/or other computing entities.

The cryptography service 106 may provide access to cryptographic keys among a plurality of key stores (e.g., by generating and providing cryptographic keys or referring to other systems that are operable to generate and provide cryptographic keys) and security preferences for how the cryptographic keys should be used by clients that request the keys. In some embodiments, the key store may be implemented by a hardware security module (HSM) capable of storing cryptographic keys. The key store may be a component included within the cryptography service, within the client, at a remote location and are accessible via an interface provided by the cryptography service, and any combination thereof.

In some embodiments, a cryptography service may be used to encrypt data via an API, a job, as a logical task, and other types of routines. As an example, the cryptography service that support an Encrypt( ) API can receive as input parameters: data to encrypt, a key identifier for uniquely identifying a cryptographic key that may be used to encrypting the data, an encryption context of labeled metadata describing the data to be encrypted, and an optional parameter for additional authenticated data (AAD). The cryptography service may receive the API request, obtain a cryptographic key from the key identifier, select an encryption configuration (e.g., an encryption algorithm and a block size) from a plurality of encryption configurations that comply with a security policy, encryption context, and client encryption capabilities. The provided data may be encrypted in accordance with the selected encryption configuration, using the cryptographic key obtained at least in part by using the key identifier, and in accordance with the client encryption capabilities. The encrypted data may be made available such that the encrypted data is capable of being decrypted with the encryption configuration and the cryptographic key used to encrypt the data. This key may be referred to as the client's master key.

In some embodiments, the cryptography service may be configured to check that data to be encrypted by the cryptography service conforms to a specific format. For example, a cryptography service may be programmed to check that any data to be encrypted must be less than 8 kilobytes (KB) in size, thereby causing clients to encrypt data greater than 8 KB themselves. This constraint may, for example, be based at least in part on considerations of improved scalability and performance of the cryptography service for a plurality of clients in a multi-client environment. In some embodiments, the cryptography service may return a failure when it receives a request to encrypt data that is beyond the required limit.

In embodiments where data to be encrypted is greater than a size limit enforced by the cryptography service, or in other contexts, the client may transmit an application programming interface request for a data key to the cryptography service. The request may specify a key identifier of a cryptographic key managed by the cryptography service (managed key). The cryptography service may generate or otherwise obtain a data key and encrypt the data key using the managed key. Encryption may be in accordance with an encryption configuration, such as described above and, generally, in accordance with a policy associated with the managed key. The cryptography service may provide a response to the request that includes the data key and the encrypted data key. The client may then use the data key to encrypt the data, delete any in-memory copies of the data key, and store the encrypted data key in association with the encrypted data (e.g., together with the encrypted data or in a database that associates the encrypted data key with the encrypted data). The data may be encrypted by transmitting a request (specifying the key identifier) to decrypt the encrypted data key to the cryptography service. The cryptography service may select the managed key, decrypt the encrypted data key, and provide the decrypted data key in response to the request, thereby enabling the client to use the data key to decrypt the data.

In some embodiments, the cryptography service may provide additional functionality. For example, the cryptography service may be configured to Authenticate a message or data, for example, via an API, a job, as a logical task, and other types of routines. A client such as the first client 102 may provide, to the cryptography service, a message 108 to be authenticated. In response, the cryptography service may generate a message authentication code (MAC) tag using a cryptographic hash function that accepts, as inputs, an input message or data (e.g., the message 108 shown in FIG. 1) and a cryptographic key. In some embodiments, the cryptographic key used with the cryptographic hash function may be bound to the identity of the calling client (i.e., the cryptographic key is selected based on the identity of the calling client) and in other embodiments a key identifier for the cryptographic key may be provided by the client. The cryptographic hash function may generate a MAC tag as an output and the cryptography service may provide the MAC tag in response to a request to Authenticate a message or data. It should be noted that other methods of providing assurances of integrity and authenticity may be used. Integrity may refer to the assurance that message or data is not modified either maliciously or accidentally; authenticity may refer to assurances of the author of the message or data. For example, the cryptography service may Authenticate a message or data by generating a digital signature.

In some embodiments, the cryptography service may provide additional functionality, for example, via an API, a job, as a logical task, and other types of routines. For example, the cryptography service may be configured to Verify a MAC tag, digital signature, or the like. A client such as the second client 104 may provide, to the cryptography service, a MAC tag 110 to be verified. In response, the cryptography service may verify the authenticity of a MAC tag by comparing the computed MAC tag with one that it generates from the message and the cryptographic key. If the computed and provided MAC tags match, the verification should indicate that the message is authentic.

In various embodiments, cryptographically protected communications 114 are used for the purpose of transmitting data between two or more parties in a manner that prevents other parties from accessing, reading, or modifying the data. A cryptographically protected communication may also guarantee that a communication that purports to originate from a source is actually from the purported source and may, in some embodiments, be cryptographically verifiable by the recipient. A cryptographically protected communication may refer be used, for example, to ensure the integrity of the data traversing a network between two or more entities and/or to ensue confidentiality of the data as it traverses the network.

For example, the cryptographically protected communication 114 shown in FIG. 1 may be an encrypted session where the first client 102 and the second client 104 utilize a shared secret to ensure confidentiality of communications over the encrypted session. An example of an encrypted session is a transport security layer (TLS) session such as described in RFC 5246 which is hereby incorporated by reference. However, a cryptographically protected communication need not be encrypted—for example, in some embodiments, the cryptographically protected communication 114 may provide assurances of integrity but not confidentiality, such that third parties may be able to read the contents of the cryptographically protected communication but will be unable to modify the cryptographically protected communication without destroying the validity of the communication. In some embodiments, MAC tags, digital signatures, or the like may be utilized to establish a cryptographically protected communication.

In various embodiments cryptographically protected communications sessions are used for the purpose of accessing resources. The cryptographically protected communications sessions may be used for example, for the transfer of data from one entity to another such as from a client to a server or from the client to the server. The cryptographically protected communications session may be used to ensure integrity of the data traversing a network between the entities and/or to ensure confidentiality of the data as it traverses the network.

In some embodiments, the cryptography service may not have access 112 to the cryptographically protected communications. Access to the cryptographically protected communications may refer to the cryptography service having the ability to participate in the communication session, for example, by sending and receiving messages in a session. In some embodiments, the cryptography service may be unable to decrypt data that is encrypted via a protocol specified in the cryptographically protected communication (e.g., the cryptography service is unable to decrypt data sent over a TLS session between the clients). Although the cryptography service may have access to some cryptographic keys in the computing environment (e.g., a client master key) it may not have access to other information that is necessary to access the cryptographically protected communication (e.g., a shared secret between the first client 102 and second client 104 may be kept secret from the cryptography service). In some embodiments, the access 112 may refer to the cryptography service's ability to modify communications. For example, the cryptography service may have the ability to read a communication between the clients 102 and 104, but may be unable to modify the communication, for example, because the communication contains a digital signature that was generated using a private key that the cryptography service does not have access to.

Figure 2:
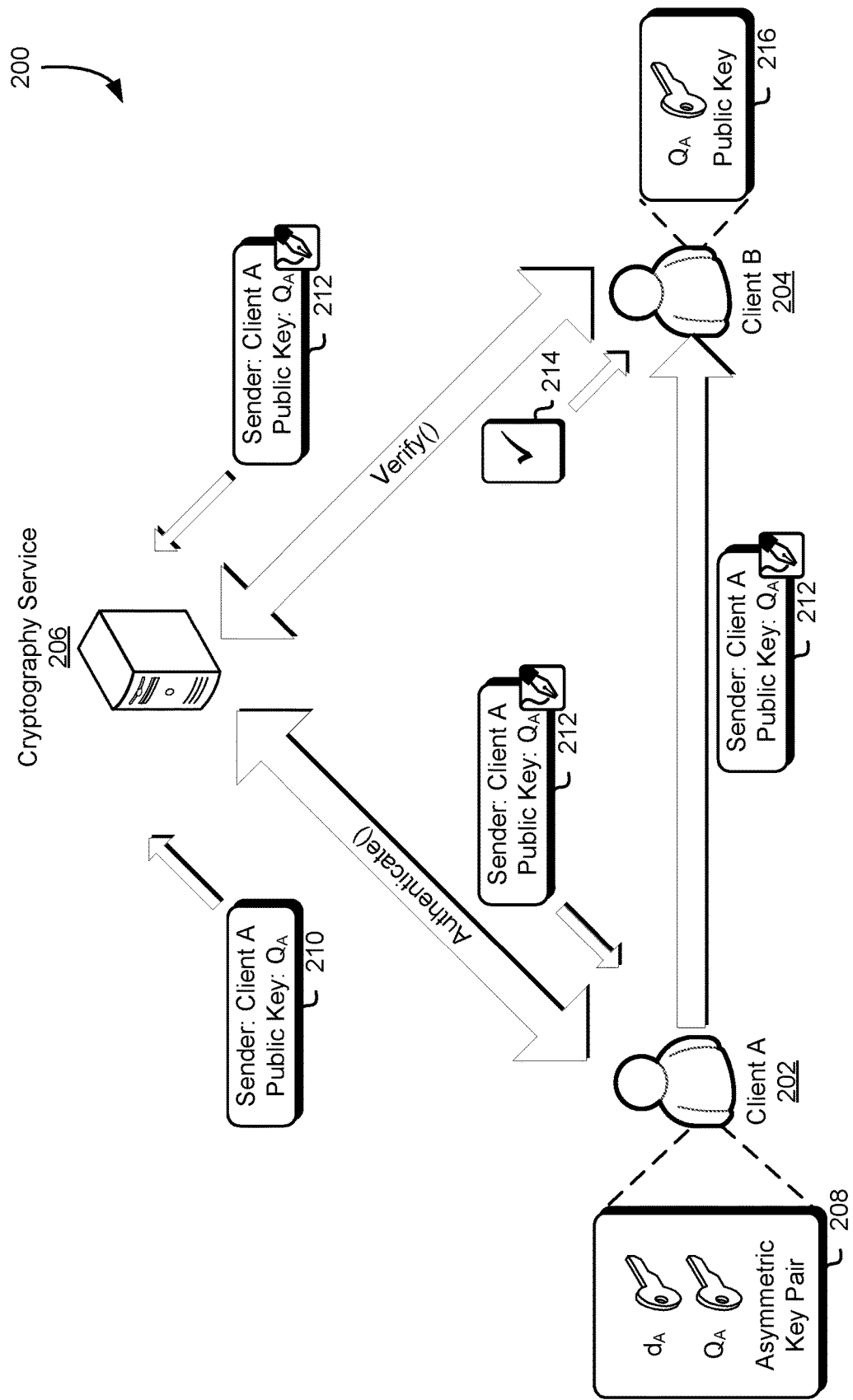
FIG. 2 illustrates an environment in which a partially trusted cryptography service is used to exchange an elliptic curve Diffie-Hellman key pair.

FIG. 2 shows an illustrative environment 200 for exchanging an ECDH key pair using a partially trusted cryptography service 206. A first client 202 may have an ECDH key pair 208 that includes a private key $d_A$ and public key $Q_A$. It should be noted that while an ECDH key pair is shown in the embodiment illustrated in FIG. 2, other types of asymmetric key pairs may also be utilized in accordance with this disclosure. In some embodiments, the client 202 may generate the ECDH key pair during the key exchange process, but in other embodiments, the key pairs may be pre-generated or may be provided to the client 202, for example, by a trusted source such as a hardware security module (HSM) not shown in FIG. 2. The clients 202 and 204 shown in FIG. 2 may, for example, be similar to clients described above in connection with FIG. 1.

In some embodiments, the cryptography service 206 may be trusted to perform Authenticate and Verify operations but may not be sufficiently trusted to perform other operations, such accessing a cryptographically protected communication session between the clients 202 and 204. In some embodiments, it may be architecturally unsound to provide access to the cryptographically protected communication session to the cryptography service. In some embodiments, the cryptography service may be potentially be accessible by parties other than the clients 202 and 204. In some embodiments, there may be advantages to not providing a shared secret to the cryptography service—for example, the cryptography service may, under such circumstances, become an identifiable target for malicious attacks if a large number of clients trust the cryptography service with a shared secret.

In some embodiments, the cryptography service 206 may store a set of cryptographic keys, for example, in a hardware security module (HSM) not shown in FIG. 2. The cryptography service may have a set of client master keys wherein each client master key is associated and owned by a particular client. The client master keys may be associated with their respective clients as part of a registration process where the cryptography service establishes a trust relationship with the registrant, for example, by requiring the registrant to enter a password, provide a security token, or provide other proof of the identity of the registrant to prevent spoofing attacks.

The cryptography service 206 may allow callers to perform several cryptographic operations. A particular client may call the cryptography service to perform a variety of cryptographic operations, and may, in some embodiments allow other clients to use its cryptographic key to perform all or some of the cryptographic operations supported by the cryptography service. For example, a particular client may use its client master key to generate a digital signature to prove that a particular message came from that client service. Related to the previous example, other clients may request the cryptography service validate whether a digital certificate is valid. In some embodiments, the cryptography service may also be usable by a client to encrypt data to produce a ciphertext output, and to decrypt data, to produce a plaintext output (which may still be obfuscated, for example, when multiple layers of encryption are applied to data). These operations may be performed using the client master key which is securely stored by the cryptography service.

The cryptography service may also provide authenticated encryption operations. In some embodiments, a cryptography service may support an Encrypt(KeyID, Data, AAD) request, API, or command. The KeyID may be associated with a particular client, and may be associated internally, by the cryptography service, to a particular client master key. In some embodiments, the KeyID may be an optional input or may be implied (e.g., the caller's identity may be used to determine a KeyID). Additional Authenticated Data (AAD) may be used for various purposes and may be data that is not necessarily encrypted, but that is authenticated, e.g., by an electronic signature, a message authentication code or, generally, a keyed hash value included with the AAD. In some embodiments, the ciphertext is generated including at least a portion of the AAD. In some other embodiments the AAD is provided separately during decryption. In some other embodiments, the AAD is generated at decryption time based at least in part on the request and or other metadata such that decryption will only succeed when the metadata passes. In some embodiments, policy may constrain whether a cryptographic operation can be performed with respect to particular AAD. Processing of Encrypt(KeyID, Data, AAD) requests may require, by programming logic and/or policy enforced by the cryptography service, both that the AAD contain particular values and that the AAD be authentic (e.g., not modified since original transmission). Similarly, a Decrypt(KeyID, Ciphertext, AAD, Tag) request may be used to cause the cryptography service to decrypt the specified ciphertext using a key identified by the KeyID. The AAD in the Decrypt(KeyID, Ciphertext, AAD, Tag) request may be used such as described above to generate an authentication tag that is compared against the input Tag. For instance, processing of the Decrypt(KeyID, Ciphertext, AAD, Tag) may require, by programming logic and/or policy enforced by the cryptography service, both that the AAD contain particular values and that the AAD be authentic (e.g., not modified since original transmission). In some embodiments, the Decrypt( ) request will fail where the generated authentication tag does not match the input Tag.

In some embodiments, the Encrypt( ) API generates metadata that is associated to the ciphertext. For example, an Encrypt( ) API may generate a ciphertext and append to it metadata that includes the KeyID used in the encryption operation. In such an embodiment, the Decrypt( ) API may not require a KeyID as an input (i.e., a Decrypt(Ciphertext, AAD, Tag) request may replace or be an alternative to a Decrypt(KeyID, Ciphertext, AAD, Tag) request). In some embodiments, the cryptography service may generate an authentication tag over the ciphertext and metadata during the encryption operation and verify the authentication tag during decryption to ensure that the correct cryptographic key is used for decryption.

In some embodiments, an ECDH key pair 208 is generated by the client 202. The ECDH key pair may include a private key $d_A$ and a public key $Q_A$. However, other types of asymmetric key pairs may be generated instead, and the private key kept secret from other parties. The ECDH key pair may be generated, for example, as part of a handshake protocol or may be pre-generated (e.g., one or more ECDH key pairs are generated at a point in time and distributed for use later on as cryptographically protected communication sessions are formed). In some embodiments, the ECDH key pair may be an ephemeral cryptographic key that is usable only for a single session and is invalid thereafter. In some embodiments, the ECDH key pair may be usable only for a single message and is invalid thereafter (requiring a second ECDH key pair for a second message).

The message 210 may be generated by the first client 202 and includes at least the sender's identity and the public key. The message may be used to bind the sender's identity with the public key by attesting that the public key is associated to the sender and that the sender has possession of the corresponding private key. A binding in this context may refer to an association between a cryptographic public key and a client or entity that has access to the corresponding cryptographic private key. The binding may be implied (e.g., a protocol defines that a message or message format containing a public key and client ID binds the key to the client) or may be explicitly stated in the message. In some embodiments, a message that binds a cryptographic public key to sender information may be digitally signed or a MAC tag may be generated over the binding.

The first client's identity may be encoded, for example, as a user ID, a GUID, a machine ID, media access control address (MAC address), or the like. Additionally, dynamic identifiers such as a dynamic IP address may be used to identify the first client. The message 210 may be provided to the cryptography service as part of a handshake protocol to establish a cryptographically protected communication session. The message 210 may be provided to the cryptography service with a request to Authenticate the message. The authentication may be performed by the cryptography service using the client master key associated with the first client 202. The client may provide a key identifier to the cryptography service as part of the request. In some embodiments, the cryptography service may perform security and parameter checks to ensure that the request should be made, for example, checking that the client has sufficient privileges to Authenticate data or, more specifically, the Authenticate data under a specific key identifier. In some embodiments, the message may also contain a key identifier corresponding to the key used in the Authenticate operation, a key identifier corresponding to the key that may be used in a corresponding Verify operation, or both.

In some embodiments, the Authenticate request is processed by the cryptography service by generating a MAC tag over the message's contents using a cryptographic hash function. The MAC tag 212 may be provided by the cryptography service to the first client 202, for example, as part of a response. The MAC tag 212 may be provided either synchronously or asynchronously. In some embodiments, a digital signature, rather than a MAC tag, may be generated using a cryptographic private key associated with the first client 202. In such an embodiment, a corresponding cryptographic public key may be used to Verify the authenticity of the digital signature. The public key may, in some embodiments, also be stored in the cryptography service, but in other embodiments, may be stored with a separate entity, for example, a certificate authority (not shown in FIG. 2). The MAC tag and the message containing the sender client information and public key $Q_A$ may be provided to the second client 204. In some embodiments, the first client 202 may transmit said data directly to the second client 204, for example, over a network connection. In other embodiments, the first client 202 may transmit said data indirectly to the second client 204, for example, by storing said information in a predetermined location that the second client 204 may retrieve from.

In some embodiments, the second client may receive a message containing sender identity information and a public key $Q_A$ and a MAC tag attesting to the authenticity of the message. The second client may provide the message and MAC tag to the cryptography service 212 with a request to Verify the authenticity of the message. In some embodiments, the second client 204 may also provide a key identifier corresponding to the cryptographic key to be used in the Verify operation. The cryptography service 206 may, in some embodiments, determine that the message provided with the MAC tag is authentic and provide an indication 214 that the information is valid. In some embodiments, an indication of failure when the Verify operation fails or determines that the message is not authentic may be provided either in addition to or instead of an indication of success. Upon determining that the message is valid (e.g., upon receiving an indication 214 that the information is valid), the second client 204 may obtain the public key $Q_A$ included in the message. The public key may be persisted, archived, cached, or stored in short-term memory.

In an alternative embodiment, the key exchange shown in environment 200 may be performed using Encrypt and Decrypt. For example, the first client 202 may provide the message 210 with the sender identity information and public key $Q_A$ to the cryptography service with a request to encrypt the message 210. The cryptography service may use a client master key to encrypt the message and return the encrypted message to the first client 202, who then provides the encrypted message to the second client 204. The second client may provide the encrypted message to the cryptography service as part of a Decrypt request and the cryptography service may decrypt the message and, as part of fulfilling the request, provide a key identifier corresponding to the client master key used to decrypt the message in a response to the second client 204. Upon receiving the response, the second client 204 may check that the key identifier used to decrypt the message corresponds to the first client 202. So long as the first client 202 does not allow access to other parties to encrypt using its customer master key, the second client 204 may be assured that the public key contained in the encrypted message is from the first client and usable for cryptographically protected communication with the first client. In such an embodiment, the second client 204 may not be required to handle an unauthenticated public key, whereas under some embodiments in accordance with FIG. 2, the second client 204 may, before receiving the indication 214 that the information is valid, have access to a plaintext public key $Q_A$ from the message that is not usable because the public key has not yet been authenticated.

In some embodiments, the encrypted message may, in addition to including public key $Q_A$, also include a nonce that the first client 202 requires the second client 204 to acknowledge before establishing a cryptographically protected communication session. For example, as part of a handshake protocol, the first client 202 may refuse to accept a public key $Q_B$ (e.g., in connection with FIG. 3) from the second client 206 if it is not accompanied by the nonce. Requiring a reply include the nonce, in some embodiments, may provide additional security by preventing replay attacks or freshness guarantees of the messages that the first client 202 receives from the second client 204. In some embodiments, the nonce may include a timestamp.

Figure 3:
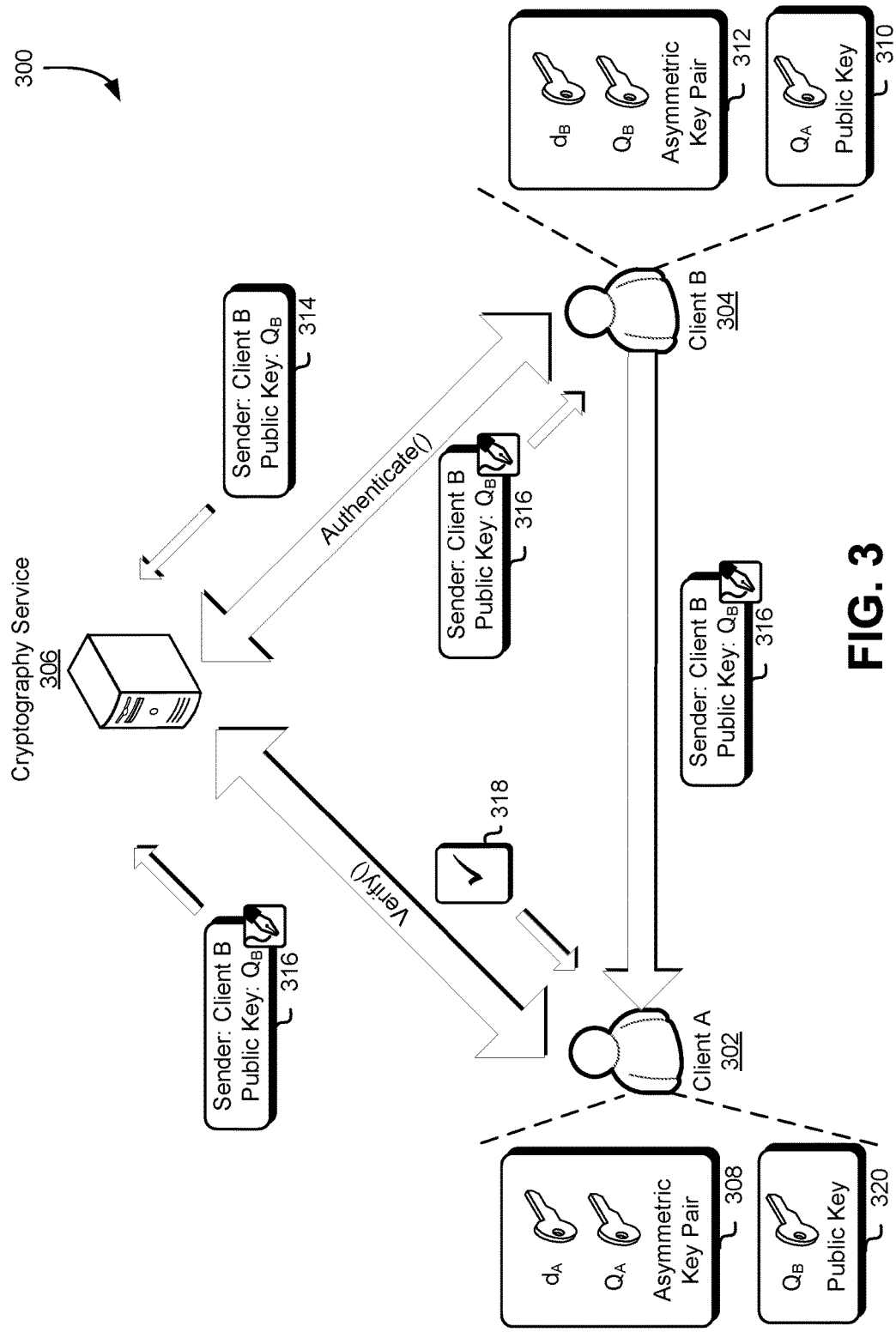
FIG. 3 illustrates an environment in which a partially trusted cryptography service is used to exchange an elliptic curve Diffie-Hellman key pair.

FIG. 3 shows an illustrative environment 300 for exchanging an ECDH key pair using a partially trusted cryptography service 306. The first client 302, second client 304, and cryptography service 306 may be similar to those described above in accordance with FIGS. 1 and 2. The ECDH key pair 308 may include a private key $d_A$ and public key $Q_A$, where the private key $d_A$ is kept secret from other components in the environment. The ECDH key pair 308 may be generated by the first client 302 as part of a handshake protocol. The second client 304 may have public key $Q_A$ 310. In addition, the second client 304 may have a second ECDH key pair 312 that includes a private key $d_B$ and public key $Q_B$. The second client's public key $Q_B$ 320 may be provided to the first client 302 in a similar manner to the key exchange described in FIG. 2. A message 314 with the second client's identity information and public key $Q_B$ may be provided to the cryptography service 306 as part of an Authenticate request and a MAC tag 316 may be generated using a customer master key associated with the second client 304, provided to the second client 304, and forwarded to the first client 302. The first client may provide the message and MAC tag as part of a Verify request to determine the authenticity of the message to determine whether the message was actually authored by Client B 304. Upon an indication 318 that the message is authentic, Client A 302 may store the public key $Q_B$ for use in establishing a shared secret with Client B 304. A share secret may, for example, be used to establish a cryptographically protected communication session between the clients. The public key $Q_B$ may also be exchanged using Encrypt and Decrypt operations in lieu of Authenticate and Verify operations in the same or similar manner as described above in connection with FIG. 2.

Figure 4:
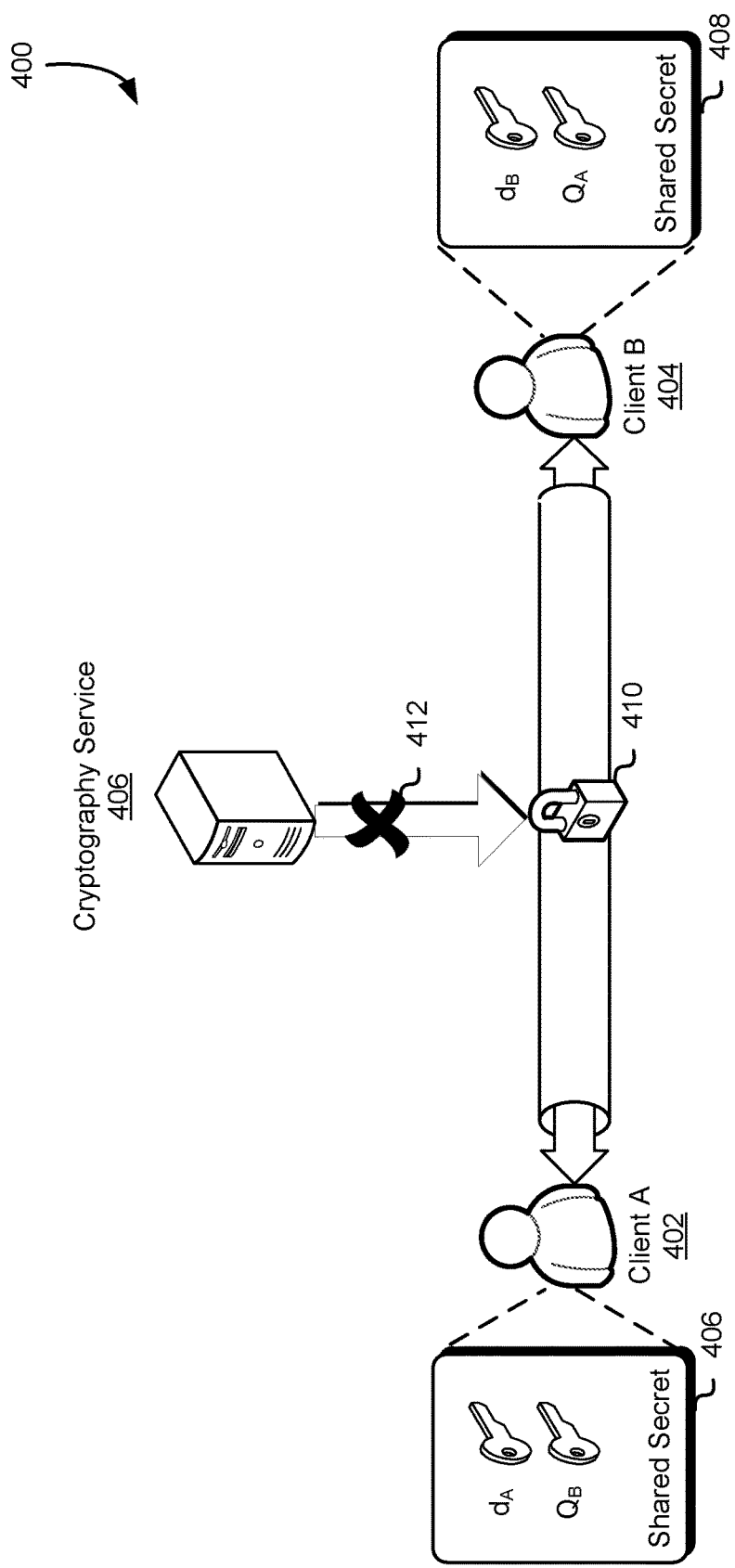
FIG. 4 illustrates an environment in which two clients establish a cryptographically protected communication session.

FIG. 4 shows an illustrative environment 400 in which two clients establish a cryptographically protected communication session. The first client 302, second client 304, and cryptography service 306 may be similar to those described above in accordance with FIGS. 1-3. In some embodiments, the first client 402 may have generated an ECDH key pair including a private key $d_A$ and public key $Q_A$ where the public key $Q_A$ has been distributed to the second client 404, perhaps in accordance with embodiments described above in FIG. 2. Likewise, the second client 404 may have generated a second ECDH key pair including a private key $d_B$ and a public key $Q_B$ where public key $Q_B$ has been distributed to the first client 402, perhaps in accordance with embodiments described in FIGS. 2-3.

In some embodiments, the first client 402 has a shared secret 406 that may be generated using at least $d_A$ and $Q_B$ and the second client 404 has a shared secret 408 that may be generated using at least $d_B$ and $Q_A$. In embodiments using an elliptic curve Diffie-Hillman key agreement protocol, the shared secret may be calculated by both parties because $d_A Q_B = d_B Q_A$. A cryptographically protected communication session 410 may be established using the shared secret. In some embodiments, the cryptography service 406 may not have access to both private keys $d_A$ and $d_B$, and will not be able to access 412 the cryptographically protected communication session. In some embodiments, access 412 to the cryptographically protected communication session 410 may refer to the cryptography service having the ability to participate in the communication session, for example, by sending and receiving messages in a session. In some embodiments, the cryptography service may be unable to decrypt data that is encrypted via a protocol specified in the cryptographically protected communication (e.g., the cryptography service is unable to decrypt data sent over a TLS session between the clients). Although the cryptography service may have access to some cryptographic keys in the computing environment (e.g., a client master key) it may not have access to other information that is necessary to access the cryptographically protected communication (e.g., the shared secret 406 and 408, and/or the private keys $d_A$ and $d_B$). In some embodiments, the access 412 may refer to the cryptography service's ability to modify communications. For example, the cryptography service may have the ability to read a communication between the clients 402 and 404, but may be unable to modify the communication, for example, because the communication contains a digital signature that was generated using a private key that the cryptography service does not have access to.

Figure 5:
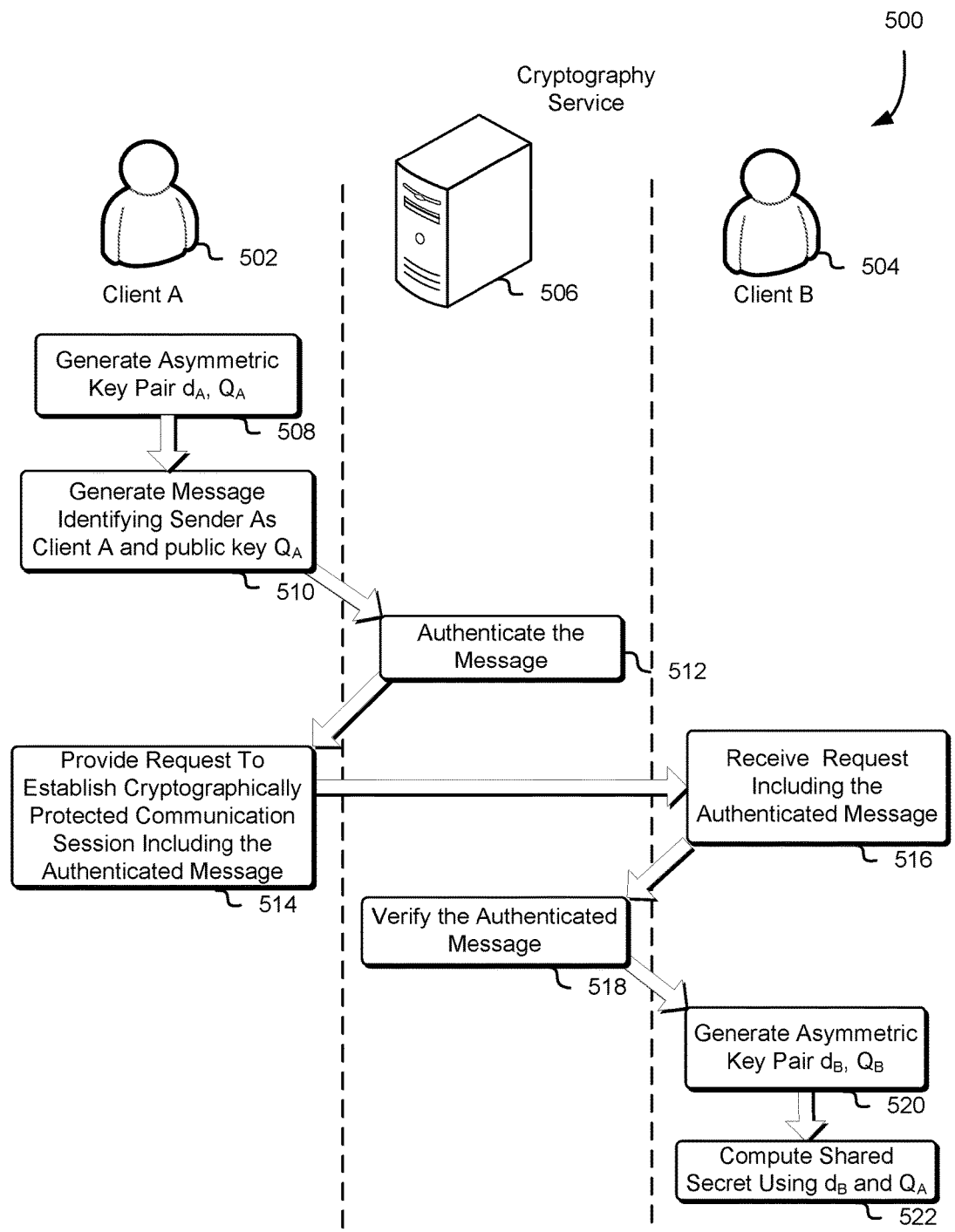
FIG. 5 shows a diagram illustrating communications between a first client, a second client, and cryptography service in accordance with an embodiment.

FIG. 5 shows a diagram illustrating a handshake protocol between a first client 502, a second client 504, and cryptography service 506 in accordance with an embodiment. As part of the handshake protocol, the first client may generate 508 an ECDH key pair including a private key $d_A$ and a public key $Q_A$. In some embodiments, the ECDH key pair may be pre-generated prior to the start of the handshake.

After the ECDH key pair has been generated, Client A may generate 510 a message identifying the sender and the public key $Q_A$. The message may be in accordance with those described above in connection with FIGS. 1-3. Client A may then provide 512 the message to the cryptography service to be Authenticated. In some embodiments, the message may be provided to the cryptography service through a web API. The cryptography service 510 may generate a digital signature or MAC tag over the message using a cryptographic key. Client A may provide, to the cryptography service, as part of the request to Authenticate, a unique identifier corresponding to the cryptography key to be used in by the cryptography service for authenticating the message. In some embodiments, the key identifier may be provided in the message, but in other embodiments the key identifier may be provided as a separate parameter in a web API request, and in yet other embodiments, the key identifier may be implied based on the identity of the caller. The cryptography service may return, to Client A, an authenticated message that includes the message and a MAC tag. In some embodiments, Client A may retain a copy of the original message and the cryptography service returns a MAC tag.

In some embodiments, Client A may provide 514 a request for a cryptographically protected communication session including the authenticated message to Client B. The request may, for example, be a request such as those described in connection with FIGS. 1-3. The request may include the messaging containing Client A's identity information and the public key $Q_A$ and the corresponding MAC tag.

In some embodiments, Client B may receive 516 a request to establish a cryptographically protected communication session including the authenticated message. In some embodiments, Client B receives the request indirectly from Client A—for example, Client A may send the request through an intermediary, Client X (not shown) that forwards the request to Client B. Note that in some embodiments, the intermediary may be another computer system, but may also be other types of computing entities capable of modifying the message, such as a router or switch. Thus, upon receiving the request, Client B may need to validate whether the request is authentic and that the contents are not modified from when it was sent by Client A. In some cases, a malicious party that intercepts Client A's message may attempt to modify the public key $Q_A$, for example, to comprise the cryptographically protected communication session.

In some embodiments, Client B may provide 518 the authenticated message to the cryptography service 506 and request the cryptography service to Verify the authenticated message. The cryptography service 506 may receive, from Client B, the authenticated message with instructions to verify its authenticity. A key identifier may also be provided as part of the request to Verify the authenticated message. In some embodiments, a cryptographic key is obtained and a MAC tag is generated over the message and the generated MAC tag is compared against the received MAC tag to determine whether the message is authentic. In some embodiments, the cryptography service may receive a digital signature be received in lieu of a MAC tag, generate a digital signature, and compare the generated digital signature with the received digital signature. After verifying the message is authentic, Client B 504 may extract the public key $Q_A$, generate 520 an ECDH key pair $d_B$ and $Q_B$, and compute 522 the shared secret using $d_B$ and $Q_A$.

Figure 6:
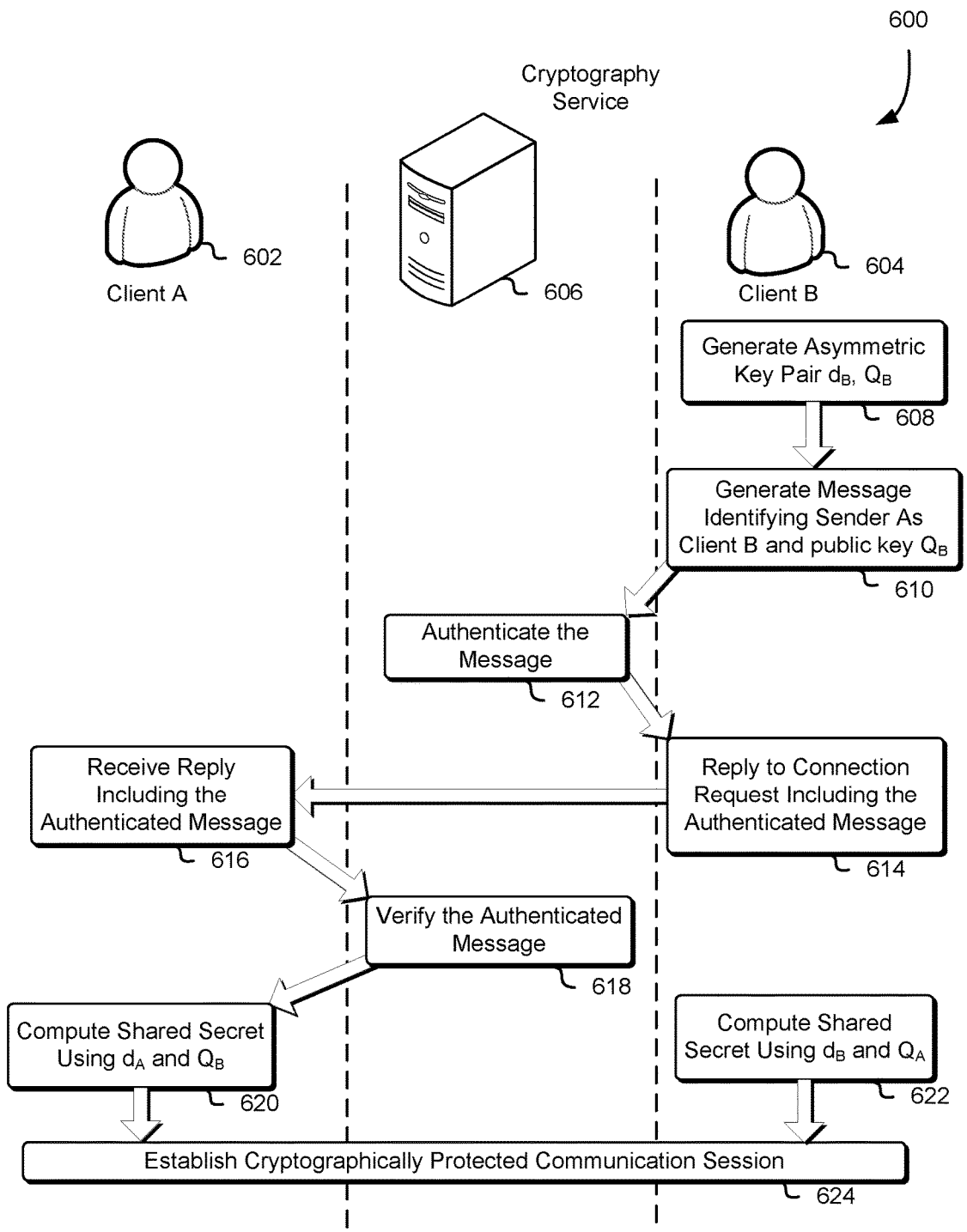
FIG. 6 shows a diagram illustrating communications between a first client, a second client, and cryptography service in accordance with an embodiment.

After receiving the ECDH public key $Q_A$, Client B 604 may exchange ECDH public key $Q_B$ with Client A 602, for example, in the manner described in FIG. 6. The environment 600 may be the same or similar environment as environment 500 described above in connection with FIG. 5. The exchange of public key $Q_B$ may be part of a handshake protocol and may occur after the flow shown in FIG. 5 for establishing a cryptographically protected communication session. It should be noted, that the keys may be generated elsewhere, such as during the flow described above in connection with FIG. 5 (specifically, see step 520). Client B may generate 610 a message identifying the sender identity as Client B and the public key QB, and provide the message to the cryptography service 606 to be authenticated, the cryptography service 606 may authenticate 612 the message, for example, by generating a MAC tag or digital signature over the message, and provide the authenticated message to Client B 604. These steps may be performed in accordance with corresponding steps described above in connection with FIG. 5. Client B may reply 614 to a request to establish a cryptographically protected communication session and include, as part the reply, the authenticated message. Client A may receive the 616 reply and perform verification by using the cryptography service to determine if the authenticated message in the reply is valid. If the request is determined to be valid, the public key $Q_B$ can be used to compute 620 the shared secret, for example, using $d_A$ and $Q_B$ in an elliptic curve Diffie-Hellman key exchange.

When both parties have computed the shared secret 620 and 622, a cryptographically protected communication session may be established using the shared secret. Once established, Client A and Client B may communicate via the cryptographically protected communication with assurances that the cryptography service does not know the shared secret, and thus does not know the private key used in the cryptographically protected communication session. This provides greater security assurances because the cryptography service cannot participate in the cryptographically protected communication session, nor any other party that may intercept the authenticated messages containing public keys $Q_A$ and $Q_B$.

Figure 7:
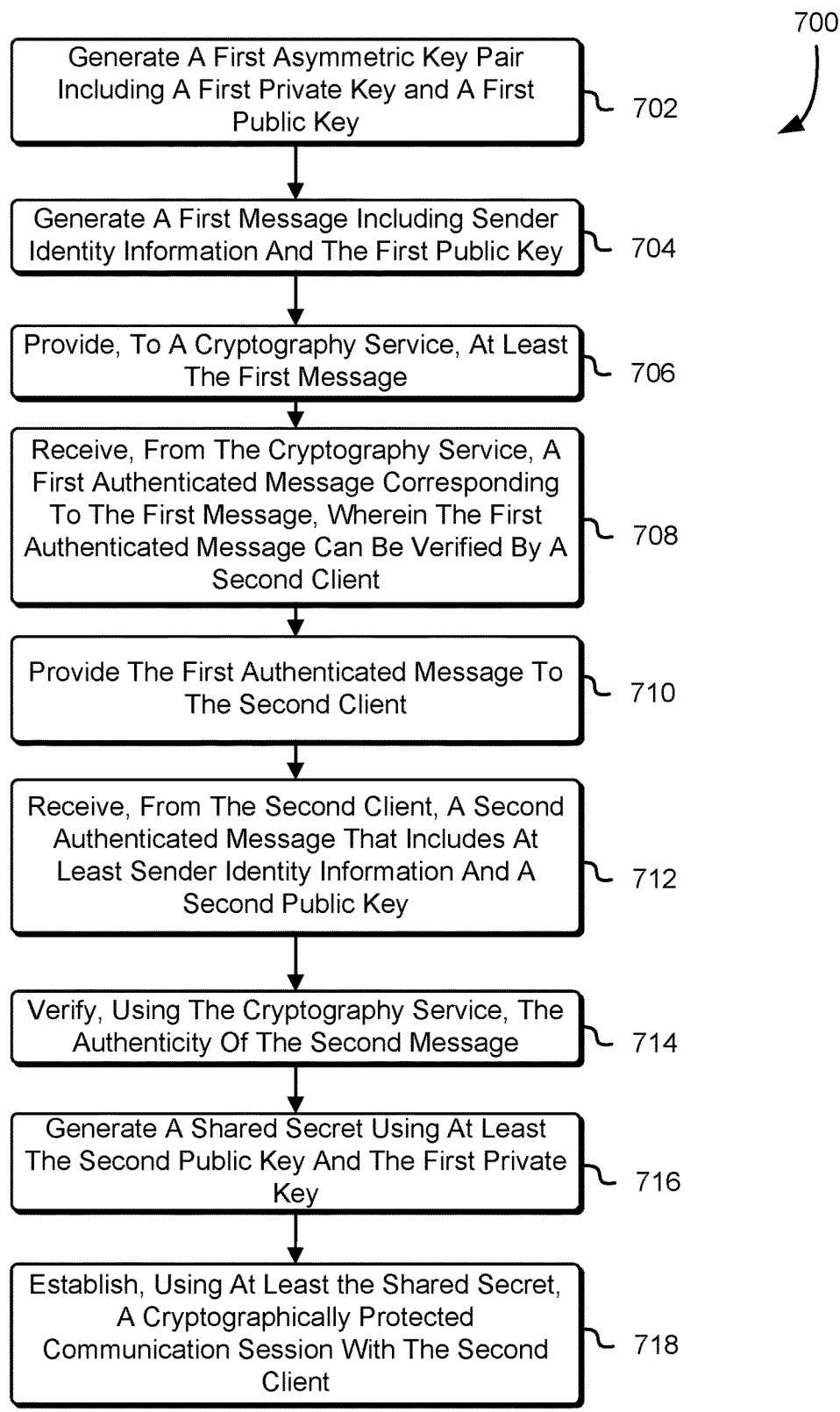
FIG. 7 shows an illustrative process for establishing a cryptographically protected communication session in accordance with an embodiment.

FIG. 7 shows an illustrative example of a process 700 for performing a handshake in accordance with an embodiment. The process 700 may be performed by any suitable system such as computer systems described in accordance with client described above in FIGS. 1-6. Note however, that the process 700 may be performed by any computer system that participates in a handshake process. Also note the handshake process may be any handshake for establishment of a cryptographically protected communication session, such as a protocol for a cryptographically protected communications session which includes a handshake protocol and a record protocol. In an embodiment, a system performing the process 700 may generate 702 a first asymmetric key pair including a first private key and a first public key. In some embodiments, the asymmetric key pair may be an elliptic curve key pair. The system may also generate 704 a first message including sender identity information and the first public key. Note that the first message may be generated, in part, before the generating of the asymmetric key pair in stage 702. For example, in some embodiments, a message may be partially generated prior to the generating of the first asymmetric key pair. The sender identity information may be encoded, for example, as a user ID, a GUID, a machine ID, media access control address (MAC address), or the like. Additionally, dynamic identifiers such as a dynamic IP address may be used to identify the sender's identity.

In some embodiments, the system may then provide 706, to a cryptography service, at least the first message that contains sender identity information and the first public key. In some embodiments, the system may instead send the sender identity information and the first public key separately to the cryptography service, and the cryptography service, after receiving at least the sender identity information and the first public key, generates a MAC tag or digital signature over both the sender identity information and the first public key.

The system may, after providing the first message to the cryptography service, receive 708, from the cryptography service, a first authenticated message corresponding to the first message, wherein the first authenticated message can be verified by a second client. The authenticated message may include either the original message or another message that includes the sender identity information and public key, and a corresponding MAC tag. The authenticated message must be cryptographically verifiable by a client that the cryptographically protected communication session is to be established with. In some embodiments, verifying a MAC tag may require access to a cryptographic key that may be protected by the cryptography service. In such embodiments, a subset of callers that attempt to verify the MAC tag may receive, from the cryptography service, an error indicating that the caller does not have access to resources needed to complete the verification request. In other embodiments, a generic error is provided such that the indication of failure does not further indicate that a cryptographic key needed to perform the verify operation was not accessible. In some embodiments, the authentic message may be encrypted such that the sender identity information and/or the public key are encrypted using a cryptographic key accessible by the cryptography service and may be decrypted by the client that the system is attempting to establish a cryptographically protected communication session with.

The system may then identify a client to establish a cryptographically protected communication session with, and provide 710 the first authenticated message to that client. The authenticated message may be provided directly (e.g., the message is included as part of a handshake protocol or request) or indirectly (e.g., a Uniform Resource Identifier (URI) is provided that may be used to locate and retrieve the authenticated message). Note that in some embodiments, the request may pass through one or more computer systems or computing entities such as a router or switch that may have the ability to inspect and/or modify the contents of the authenticated message. However, modification of the contents of the message without the correct corresponding modification of the MAC tag will be detectable.

In some embodiments, the system may receive 712, from the client to establish a cryptographically protected communication session with, a second authenticated message. In some embodiments, the second authenticated message comprises a message including identity information and a second public key, and a MAC tag that may be used to verify that the message is authentic. In some embodiments, the authentic message comprises a ciphertext of the second public key and/or identity information of the second client. The system may verify 714, using the cryptography service, the authenticity of the second authenticated message. In some embodiments, a MAC tag is generated over the message and the generated MAC tag is compared against a MAC tag that was provided; in some embodiments, a digital signature may be verified. In some embodiments, the authenticated message may be an encrypted message that is verified by being decrypted and verifying that the cryptographic key used is associated with the second client such that other parties could not have encrypted the message. In cases where the verification successfully determines the message is authentic, the system may generate 716 or calculate a shared secret using at least the second public key and the first private key. In some embodiments, the second public key may be an elliptic curve public key $Q_2$, the first private key may be an elliptic curve private key $d_1$, and the shared secret may be $d_1 Q_2$.

The system may complete a handshake and establish 718, using at least the shared secret, a cryptographically protected communication session or a cryptographically protected communication session. In some embodiments, the cryptographically protected communication session provides assurances of confidentiality, for example, a TLS session. In other embodiments, the session may not provide assurances of confidentiality, but may provide other assurances such as integrity and authentic of messages in the session.

As used herein, the term "envelope encryption" refers to techniques for improving the performance of data encryption and decryption in an environment where computational resources are limited. Computational resources may include CPU resources, memory, resources, bandwidth, and so on. In an envelope encryption scheme, there may exist a client and a cryptography service that may be used to perform cryptographic operations such as Encrypt( ) and Decrypt( ) described above. Further, the cryptography service may store a customer master key that the client may use to perform cryptographic operations. In some embodiments, there may be disadvantages to using the cryptography service to perform all encryption and decryption operations. For example, a client that connects to a cryptography service via a broadband internet connection (e.g., having a throughput of approximately 100 Mb/s), the encryption of large amounts of data (e.g., terabytes of data) may have undesirably poor performance due to the overhead involved in transferring data over the broadband connection to the cryptography service for encryption. As an example, transferring a 8 TB file over a 100 Mbps broadband connection would take over 177 hours (>1 week) to complete. Thus, it may be advantageous, in some systems, to avoid transferring the entire data block over a network for encryption.

An envelope encryption scheme may be used to improve the performance of cryptographic operations. To encrypt a large set of data, the cryptography service may generate a symmetric data key and encrypt the data key under the client master key. The encrypted data key may include additional information (possibly in plaintext) that indicates how the encrypted data key may be decrypted (e.g., a metadata field may include a key ID usable to decrypt the encrypted data key). The plaintext data key and encrypted data key may be transmitted to a client and the client may use the data key to encrypt the data. The encrypted data (encrypted under the data key) and the encrypted data key (encrypted under the client master key) may be stored together or associated together (e.g., in a database record).

To decrypt the encrypted data, a client (possibly a different client from the client that encrypted the data) may obtain the encrypted data key and request the cryptography service decrypt the encrypted data key. The cryptography service may require that a key ID be provided as part of the decryption request. If the requestor has sufficient access privileges (e.g., through being granted access rights by the client that encrypted the data) and the correct cryptography key is used to decrypt the encrypted data key, the plaintext data key may be returned and subsequently used to decrypt the encrypted data.

Figure 8:
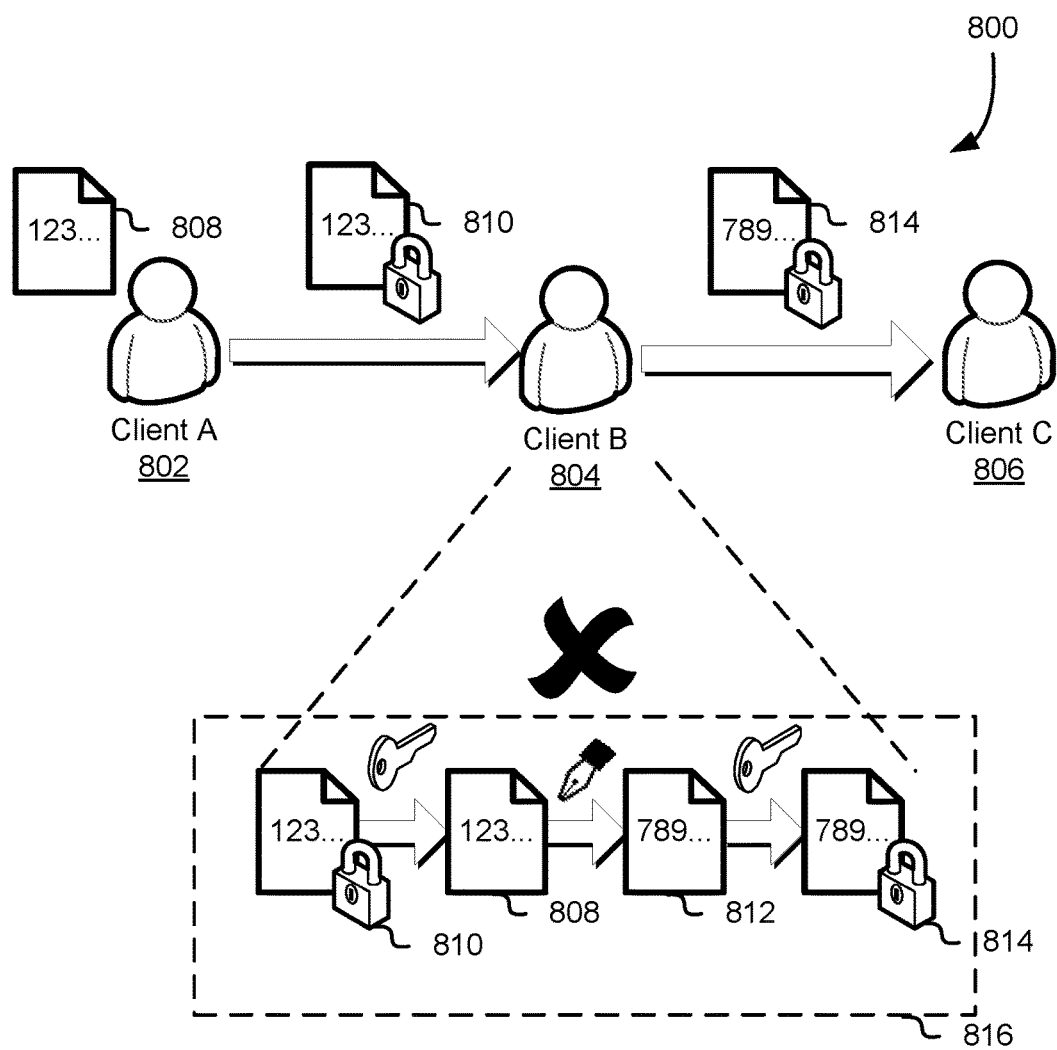
FIG. 8 illustrates an environment in which a partially trusted client is used to facilitate a cryptographically protected communication.

FIG. 8 shows a diagram 800 illustrating a context in which various techniques of the present disclosure may be utilized. In this particular example, the diagram 800 shows a first client "Client A" 802, a second client "Client B" 804, and a third client "Client C" 806. The diagram 800 further illustrates a message 808, a message protected under an enhanced envelope encryption scheme 810 (hereinbelow, a "protected message"), and a fraudulent message 814. The clients 802, 804, and 806 may be clients such as those described elsewhere in this disclosure. In some embodiments, clients may be computer systems, but may also be other types of computing entities capable of modifying the message 802, such as a router or switch.

In some embodiments, Client A 802 generates a message 808 or, more generally, data and protects the data under an enhanced envelope encryption scheme. In some embodiments, a message protected under an enhanced envelope encryption scheme 810 can be read by other clients having access to the data key used to perform the envelope encryption, but cannot be modified by those clients. In some embodiments, a cryptography service may be used to verify whether a protected message has been improperly modified. In some embodiments, Client A may modify the protected message, and may delegate the ability to modify the protected message to other parties, for example, to a subset of clients having access to the data key used to perform the envelope encryption. Thus, in some embodiments, the parties that are able to read and modify the protected message 810 may be distinct from the parties that are able to read the protected message 810—in an embodiment in accordance with FIG. 8, Client A 802 is able to read and modify the protected message, whereas Clients A, B, and C 802-806 are able to read the protected message.

In some embodiments, the sender (e.g., source address of a TCP packet) of the protected message 810 is Client A 802 and the recipient (e.g., destination address of a TCP packet) of the message is Client B 804. In some embodiments, the sender of the protected message 810 is Client A 802, the recipient is Client C 806, and Client B may be another computer system that facilitates communication between Client A and Client C. In some embodiments, the sender of the protected message 810 is Client A 802, the recipient is Client B 804, and there is an arrangement between Client A and Client B (e.g., a technical arrangement such as one described in a network protocol specification or a non-technical arrangement such as a contractual obligation or service-level agreement (SLA)).

In some embodiments, Client B 804 may attempt to perform an unauthorized modification 816 of the protected message. Client B 804 may obtain the data key, decrypt the protected message 810, modify the message (e.g., changing the message from "123 . . . " to "789 . . . " and then encrypt the modified message 812 using the data key, resulting in a fraudulent message 814. Client B 804 may then provide the fraudulent message 814 to Client C 806. However, using techniques disclosed here, Client C 806 may use a cryptography service to verify whether the message it received (i.e., the fraudulent message 814) was improperly modified.

Figure 9:
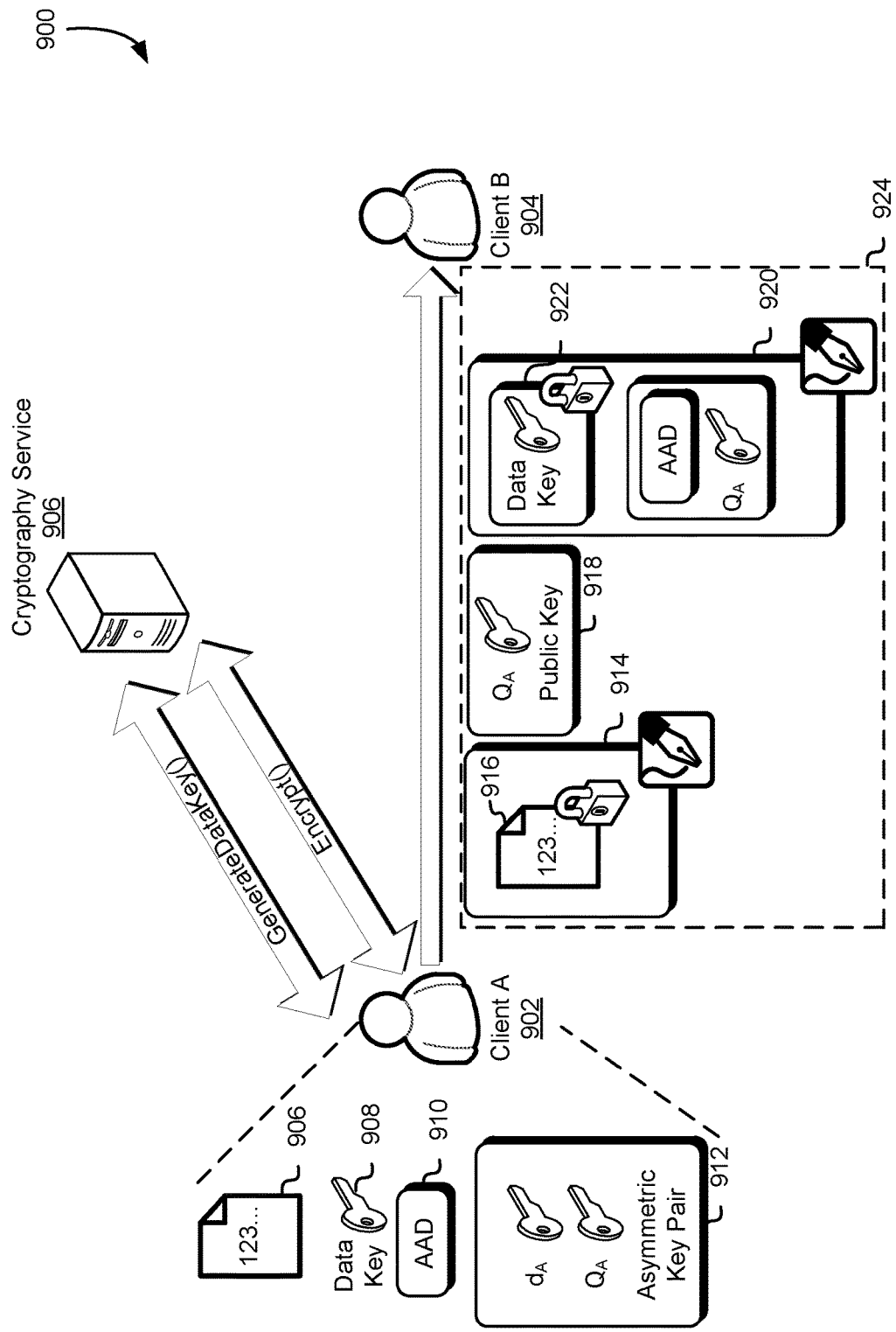
FIG. 9 illustrates an environment in which a cryptographically protected communication may be transmitted.

FIG. 9 shows a diagram 900 illustrating a context in which various techniques of the present disclosure may be utilized. In this particular example, the diagram 900 shows how a protected message may be generated and transmitted. A first client 902 and a second client 904 are shown. The first client 902 may be the same or similar to the first client 802 described above in connection with FIG. 8. The second client 802 may be the same or similar to the second client 804 described above in connection with FIG. 8, but in some examples may be the same or similar to the third client 806 described above in connection with FIG. 8. Likewise, the clients may be computer systems or computing entities described elsewhere in this disclosure.

The cryptography service 906 may be a cryptography service described elsewhere in this disclosure. In some embodiments, the cryptography service may support at least two operations—(1) generating a data key and (2) performing authenticated encryption of data. In some embodiments, a client may request (e.g., via a web API request) the cryptography service 906 generate a data key that can be used for envelope encryption. The cryptography service 906 may generate a data key, encrypt the data key using a client master key associated with the caller-client, and return both the data key and the encrypted data key to the caller-client (e.g., via a web API response). In some embodiments, the caller-client may use the cryptography service to decrypt the encrypted data key, and the caller-client may also allow other parties to decrypt the encrypted data key, for example, using a security policy over the client master key that grants specific other parties (e.g., Client B 904) the ability to decrypt data using the customer master key associated with the caller-client. For example, in an embodiment in accordance with FIGS. 9-10, Client A 902 has granted Client B 904 the ability to decrypt a data key encrypted under the customer master key associated with Client A. In some embodiments, a client may request (e.g., via a web API request) the cryptography service 906 encrypt data using an API that is the same or similar to the Encrypt( ) API described hereinabove.

In some embodiments, the first client 902 may generate, obtain, and/or store a message 906, a data key 908, an optional additional authenticated data (AAD) 910, and an ECDH key pair 912 that includes a private key $d_A$ and a public key $Q_A$. The message 906 may be a plaintext message or may be a ciphertext message that was previously encrypted. The data key 908 may be a cryptographic key that was generated by the cryptography service 906. In some embodiments, the first client 906 may have obtained, from the cryptography service, both a plaintext data key 908 and a data key encrypted under a client master key associated with the first client. In some embodiments, the first client may not have an optional AAD 910 (e.g., the optional AAD may not be used, may not exist, or may be represented by a NULL value). In some embodiments, the client 902 generates an ECDH key pair 912 including a private key $d_A$ and a public key $Q_A$. In some embodiments, the private key $d_A$ is kept secret from other parties. In some embodiments, other types of asymmetric key pairs may be used in lieu of an elliptic curve key pair.

The message 906 may be data of any form and may, in some embodiments, be authored by the client 902 (i.e., generated by the client 902) but may also be data that was obtained from another source. The data key 908 may be a cryptographic key that may be used, for example, in an envelope encryption scheme as described earlier in this disclosure. The data key may be a symmetric key or an asymmetric key. The additional authenticated data 910 may be used as part of an authenticated encryption. In some embodiments, an authenticated encryption generates an authentication tag (e.g., a MAC tag) that is based on a plaintext data input (e.g., the plaintext itself or a ciphertext version of the plaintext) and the AAD. The AAD 910 may be required to be presented for a successful decryption of a corresponding authenticated decryption. In some embodiments, the AAD 910 is not encrypted during the authenticated encryption and may be transmitted in an unobfuscated format (i.e., unencrypted).

A protected message 924 may include several components, such as those shown in FIG. 9. In some embodiments, the protected message 924 includes a digitally signed payload 914 that includes at least an encrypted message 916. The encrypted message 916 may be encrypted under the data key 908. The digitally signed payload 914 may be a digital signature generated over the encrypted message 916 using the ECDH private key $d_A$ and verifiable using the ECDH public key $Q_A$.

In some embodiments, the protected message further includes the ECDH public key $Q_A$. However, in other embodiments, the ECDH public key may be included as part of another component of the protected message (e.g., the AAD may include the public key $Q_A$).

In some embodiments, the protected message further includes an authenticated payload 920 that includes a (1) ciphertext of the data key encrypted under the client master key 922; and (2) an authentication tag (e.g., MAC tag) that is generated over the data key (either directly or indirectly) and an augmented AAD that includes the optional AAD 910 and the ECDH public key $Q_A$. In some embodiments, the authenticated payload may be generated using an authenticated encryption operation such as those described in RFC 5084, which is hereby incorporated by reference. As an example, the authenticated payload 920 may be generated by the cryptography service 906 performing an AES-CCM encryption with the following input parameters:

AES key: client master key (not shown in FIG. 9),
Nonce: (any unique value),
Plaintext: data key 908, and
Optional Additional Authenticated Data: AAD 910 and public key $Q_A$.

The AES-CCM encryption generates: (1) a ciphertext 922 of the data key and (2) a MAC tag 920 over the data key and the augmented AAD including the AAD 910 and the ECDH public key $Q_A$. In some embodiments, the augmented AAD may consist exclusively of the ECDH public key (e.g., the AAD 910 is empty). AES-GCM encryption may be performed in the same or similar manner as described above.

In some embodiments, the structure of the authenticated payload 920 may vary from the illustrative example shown in FIG. 9. In an example, the authenticated payload may include: a ciphertext that includes both the data key 908 and the ECDH public key $Q_A$ and an optional AAD (which may be empty). In this example, the authentication tag may be generated over the ciphertext and the AAD using Client A's customer master key.

In some embodiments, the structure of the authenticated payload 920 may vary from the illustrative example shown in FIG. 9. In an example, the authenticated payload may include: a ciphertext that includes the data key 908 and an optional AAD (which may be empty). In this example, the authentication tag may be generated over the ciphertext and the AAD using Client A's customer master key, and a second authentication tag may be generated over the ECDH public key $Q_A$ using the same key.

In some embodiments, the first client 902 may make the protected message available to other computing entities such as the second client 904. The system may make available the protected message either directly (e.g., the message is included as part of a handshake protocol or request) or indirectly (e.g., a Uniform Resource Identifier (URI) is provided that may be used to locate and retrieve the protected message). Note that in some embodiments, the message, when made available, may pass through one or more computer systems or computing entities such as a router or switch that may have the ability to inspect and/or modify the contents of the message. However, modifications of the contents of the message (e.g., modifying the ciphertext message without modifying the digital signature and/or modifying the ciphertext data key without modifying the authentication tag) will be detectable.

Figure 10:
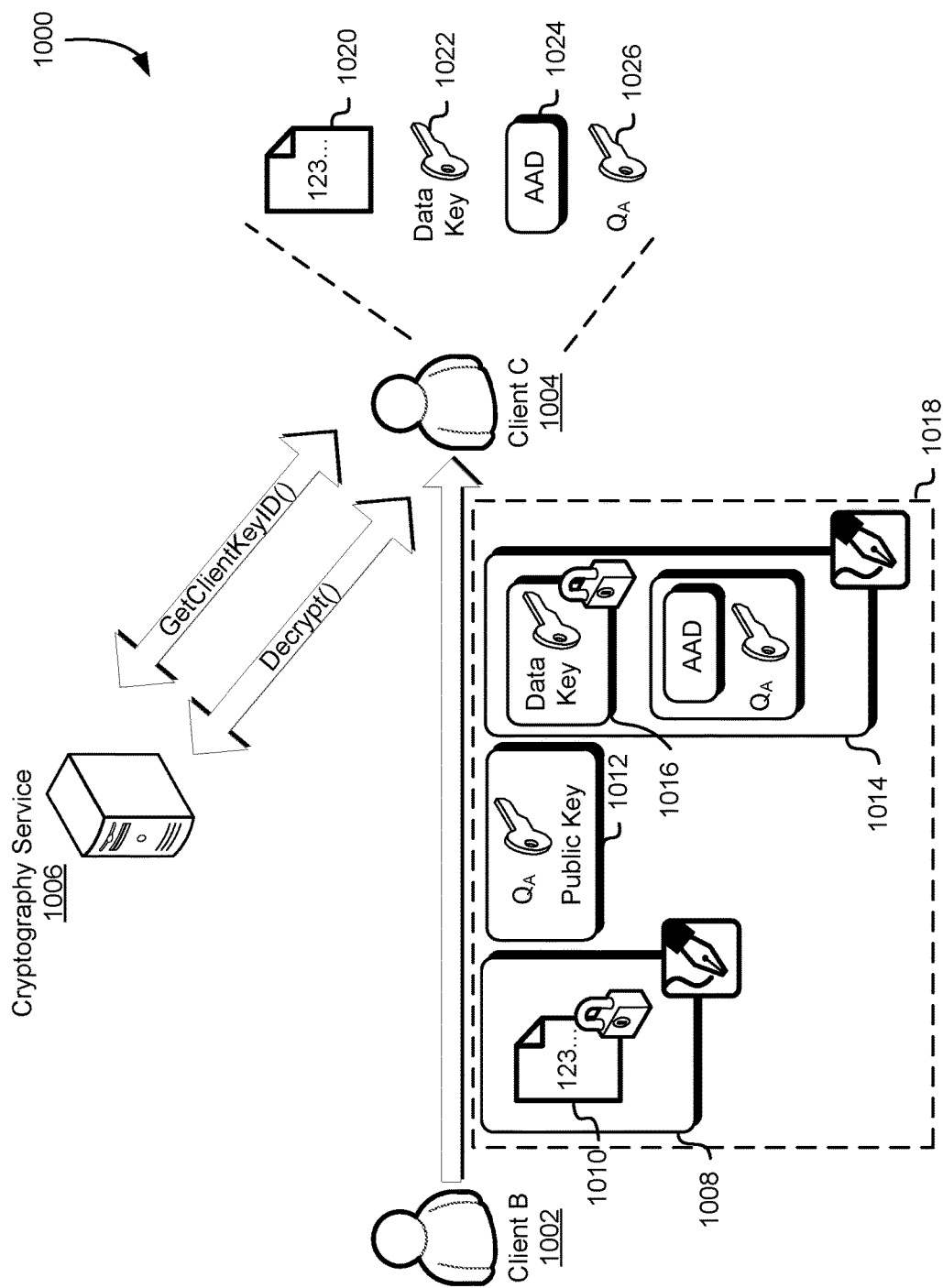
FIG. 10 illustrates an environment in which a cryptographically protected communication may be received and verified.

FIG. 10 shows a diagram 1000 illustrating a context in which various techniques of the present disclosure may be utilized. In this particular example, the diagram 1000 shows how a protected message may be received and verified. A first client 1002 and a second client 1004 are shown. The first client 1002 is shown transmitting a protected message 1018 to a second client 1004. It should be noted that the various relationships between the transmitting client, receiving client, and the protected message are completed within the scope of this disclosure—the transmitting client may have generated the protected message (e.g., Client A in FIG. 8) or may be an entity that that generates a fraudulent message and provides the fraudulent message to the receiving client (e.g., Client B in FIG. 8). In either case, a client that receives a protected message (i.e., Client C 1004) may verify whether the protected message has been improperly modified. The clients described in connection with FIG. 10 may be computer systems or computing entities described elsewhere in this disclosure (e.g., a router or switch).

The cryptography service 1006 may be a cryptography service described elsewhere in this disclosure. In some embodiments, the cryptography service may support at least two operations—(1) obtaining a client key ID and (2) decrypting data. In some embodiments, a client may request (e.g., via a web API request) the cryptography service 1006 obtain a client key ID and return the key ID to the caller-client. In some embodiments, the caller-client provides identity information such as a user ID, a GUID, a machine ID, media access control address (MAC address), or the like. The cryptography service may map the identity information to a client key ID, for example, by storing associations between identity information and client key IDs in database records of one or more database tables, in an array (e.g., a two dimensional array), in a hash map (e.g., a hash map where the keys are sender informations and the values are the key IDs), or other appropriate data structures. The client key ID may be represented as a username, integer, alphanumeric string, character array, GUID, or other such data types. The mapping of identity information to key IDs may be injective (i.e., one-to-one) and/or bijective (i.e., one-to-one and onto). In some embodiments, a client may request (e.g., via a web API request) the cryptography service 906 encrypt data using an API that is the same or similar to the Decrypt( ) API described hereinabove.

In some embodiments, the first client 1002 transmit a protected message 1018 to a second client 1004. The protected message 1018 may be the same or similar to the protected message described in connection with FIGS. 9-10. In some embodiments, the protected message includes an encrypted payload 1008 that includes a ciphertext 1010 and a digital signature over the ciphertext 1008 that is verifiable by a ECDH public key. In some embodiments, the protected message further includes an ECDH public key 1012. In some embodiments, the protected message further includes an authenticated payload 1014 that includes a ciphertext 1016 and an authentication tag over the ciphertext 1016 and augmented AAD that includes an AAD and an ECDH public key. It should be noted that the contents of the protected message 1018 received by Client C may have been improperly modified. Techniques now described allow a client that receives a protected message to determine whether the protected message was improperly modified.

In some embodiments, the client receiving a protected message (Client C 1004 in FIG. 10) uses the cryptography service to decrypt the authenticated payload 1014. The client may provide to the cryptography service, as part of a web API request, the ciphertext, the augmented AAD including both the AAD 1024 and ECDH public key $Q_A$ 1026, and the authentication tag generated over the ciphertext and augmented AAD. Likewise, in embodiments where the authentication tag is generated over the AAD (and not the public key $Q_A$), the AAD may be provided in lieu of the augmented AAD. In some embodiments, the client may also provide a key ID as part of an API request, to the cryptography service, to decrypt. The client may determine the key ID based on various information. For example, as the protected message 1018 may be sent as part of a communication session between Client C and another client whose identity is known. In such an example, the key ID may be associated with the party that Client C participates in a communication session with. As a second example, information in the protected message (e.g., metadata not shown in FIG. 10) may be used to determine the key ID. As a third example, the message may be received as part of one or more TCP packets and the key ID may be determined based on the sender's identity (e.g., source address of the TCP header).

In some embodiments, the cryptography service decrypts the ciphertext 1016 included in the authenticated message. In some embodiments, the ciphertext may include metadata (e.g., appended to the ciphertext) that includes the key ID to use for the decryption. The cryptography service may decrypt the ciphertext using a key ID and use the decrypted plaintext to generate an authentication tag using the plaintext and the provided AAD. If the generated tag and the tag provided in the decryption request do not match, the decryption may fail. In a successful decryption, the cryptography service 1006 may return, to the client, a decrypted plaintext and, in some embodiments, the key ID of the client master key used to perform the decryption. In some embodiments, the plaintext is a data key 1022 usable to decrypt the encrypted message 1010.

In some embodiments, the client 1004 may receive the decrypted plaintext 1020 and the key ID from the cryptography service as a response to a decryption request. The client may further compare the received key ID with an expected key ID. The expected key ID may be the key ID associated with the expected sender. The client may determine the expected sender based on a protocol or other information. If the received key ID and the expected key ID do not match, an error may be raised and the protected message may be discarded as invalid. However, if the received key ID and the expected key ID match, the client may store and/or cache in memory the decrypted data key 1022.

In some embodiments, the client may receive a digitally signed payload 1008. In some embodiments, the ECDH public key $Q_A$ may be used to verify a digital signature over the digitally signed payload 1008. In an embodiment, the public key $Q_A$ is included as part of an augmented AAD that is authenticated as part of a decryption operation. Upon authentication, the public key $Q_A$ may be used to verify the digital signature. If the digital signature is invalid, the protected message may be discarded as invalid. However, if the digital signature is valid, the encrypted message 1010 may be decrypted using the data key 1022 obtained from the decryption of the authenticated payload 1018. Upon completion of the decryption, the client 1004 obtains a plaintext message 1020 that has not been improperly modified.

Figure 11:
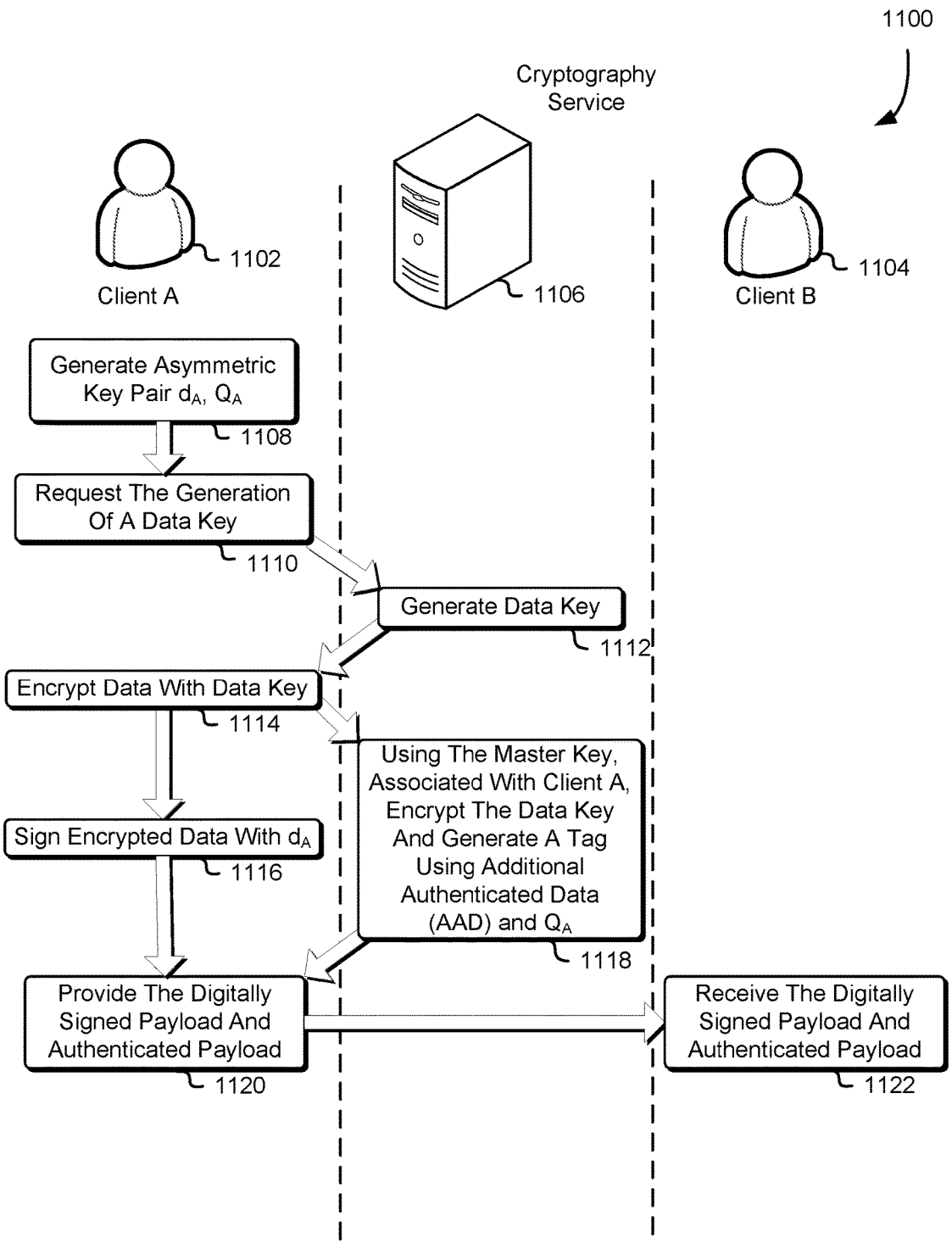
FIG. 11 shows a diagram illustrating transmission of a cryptographically protected communication.

FIG. 11 shows a diagram 1100 illustrating a first client 1102 generating a protected message. First, Client A 1102 may generate 1108 an ECDH key pair including a private key $d_A$ and a public key $Q_A$. The keys may be generated in various manners described elsewhere in this disclosure. Additionally, other types of asymmetric key pairs may be used instead of an elliptic curve key pair. Client A may also request 1100 the generation of a data key. The data key may be usable to perform an envelope encryption. The request may be made as a web API request to a cryptography service 1106 that supports functionality described elsewhere in this disclosure. The cryptography service 1106 may receive the request and generate 1112 a data key and provide the data key to the client in response to the request. In some embodiments, the data key may be generated before the ECDH key pair.

Client A may receive the data key from the cryptography service (e.g., in a response to a web API request) and encrypt 1114 a message with the data key. After encrypting the message, the ECDH private key $d_A$ may be used to generate 1116 a digital signature over the ciphertext of the message. The validity of the generated digital signature may be verifiable using the corresponding ECDH public key $Q_A$. A digitally signed payload including the digital signature and the ciphertext message may be included as part of a protected message.

After receiving the data key, Client A may issue a request, to the cryptography service 1106, to perform an authenticated encryption. The request may be a web API request and Client A may, as part of the web request, provide the data key, an additional authenticated data (AAD), and the ECDH public key $Q_A$. In some embodiments, the AAD is optional and may be omitted. The cryptography service may encrypt 1118 the data key using a client master key associated with Client A, and generate an authentication tag over the data key (either directly by using the plaintext or indirectly by using the ciphertext of the data key), AAD (if not omitted), and the ECDH public key $Q_A$. An authenticated payload including the generated ciphertext and authentication tag may be included as part of a protected message.

In some embodiments, the cryptography service may, after generating the data key, store, cache, or archive a copy of the data key. In such an embodiment, the cryptography service may also store, cache, or archive a data key encrypted using Client A's customer master key. The encrypted data key may be generated any time after the data key is generated (e.g., after the data key is generated and before the authenticated encryption request 1118). Client A may, in such an embodiment, omit providing the data key in the encryption request and the cryptography service may encrypt the data key from the store, cache, or archive.

After Client A obtains both the digitally signed payload and authenticated payload, Client A may provide 1120 both the digitally signed payload and authenticated payload to Client B 1104. In some embodiments, Client A generates a protected message that includes both the digitally signed payload and the authenticated payload and transmits the protected message. Client B may receive 1122 the digitally signed payload and authenticated payload, or, in some embodiments, a protected message constructed from at least the digitally signed payload and authenticated payload.

Figure 12:
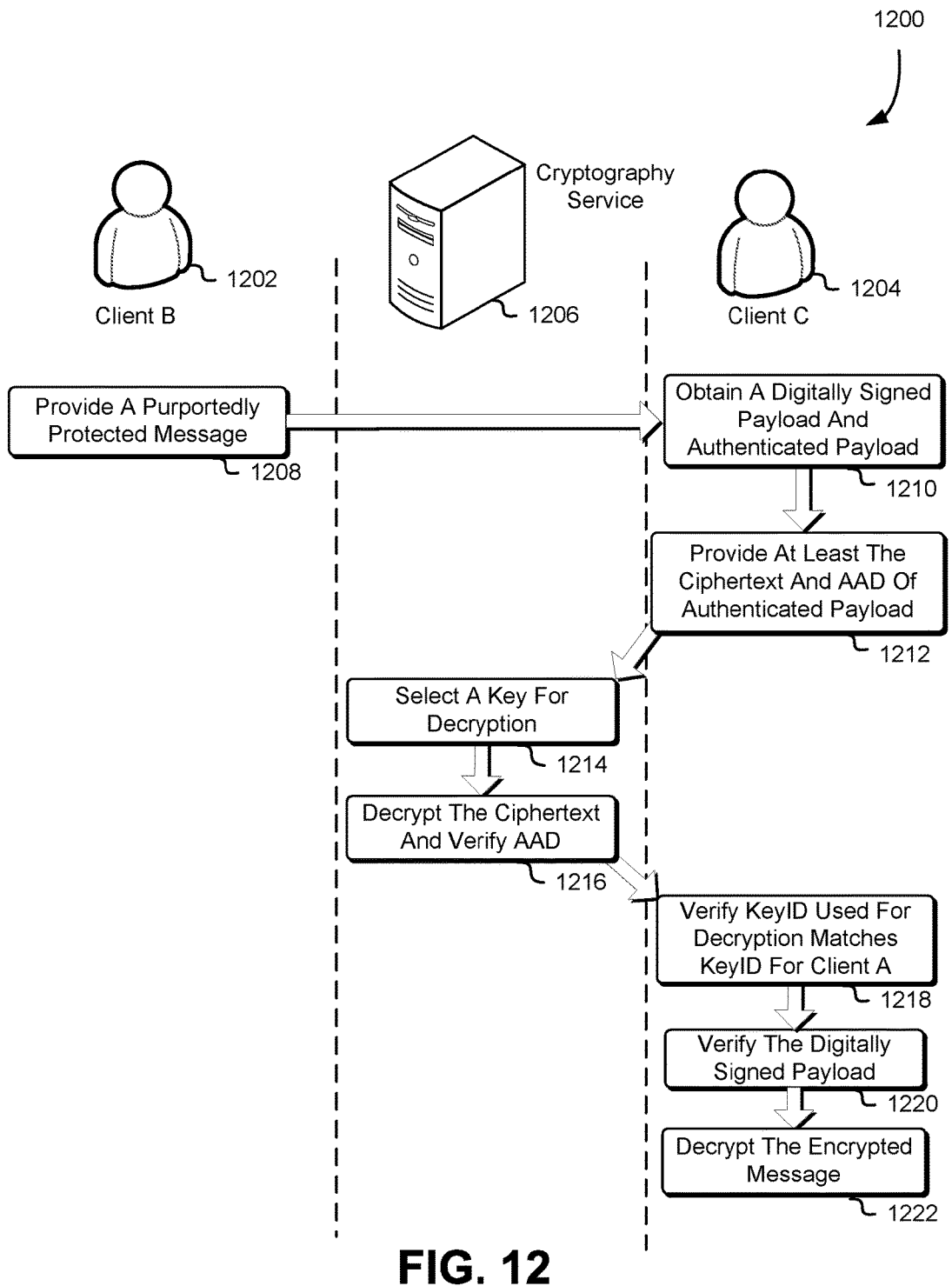
FIG. 12 shows a diagram illustrating reception and verification of a cryptographically protected communication.

FIG. 12 shows a diagram 1200 illustrating a first client 1202 sending a purportedly protected message to a second client 1204 where the second client may verify whether the message has been improperly modified. In some embodiments, Client C 1204 receives a message that purports to be a protected message that has not been improperly modified. In some embodiments, the message may be provided 1208 by the initial author of the message (e.g., the party that created the message) and in some cases, it may be an unrelated third party (e.g., a computer system within a network or a router or switch). Client C may obtain 1210 the purported protected message and obtain a digitally signed payload and authenticated payload from the message. The purportedly protected message may be of the same format as a protected message (e.g., as described in connection with FIG. 11)—however, in some embodiments, Client C may not have verified that the digital signature and/or authentication tag is valid.

In some embodiments, the purportedly protected message includes an authenticated payload that includes a ciphertext, an AAD, and an ECDH public key $Q_A$. Client C may make a request (e.g., web API request), to the cryptography service 1206, to perform a decryption operation. Client C may provide 1212, as part of the request, the ciphertext, AAD, and authentication tag of the authenticated payload. The cryptography service may select 1214 a cryptography key to use for the decryption of the ciphertext. The key may be selected, for example, based on metadata included with the ciphertext that contains a key ID corresponding to a client master key that may be used to decrypt the ciphertext. The cryptographic key and key ID may be associated using database records in one or more database tables, in an array (e.g., a two dimensional array), in a hash map (e.g., a hash map where the keys are sender informations and the values are the key IDs), or other appropriate data structures.

In some embodiments, the cryptography service decrypts 1216 the ciphertext. In some embodiments, the ciphertext may include metadata (e.g., appended to the ciphertext) that includes the key ID to use for the decryption. The cryptography service may decrypt the ciphertext using a key ID and use the decrypted plaintext to generate an authentication tag using the plaintext and the provided AAD. If the generated tag and the tag provided in the decryption request do not match, the decryption may fail. In a successful decryption, the cryptography service may return, to the client, a decrypted plaintext and, in some embodiments, the key ID of the client master key used to perform the decryption. In some embodiments, the plaintext is a data key usable to decrypt the encrypted message. In some embodiments, the AAD may be augmented to include the public key $Q_A$ (e.g., by appending the key to the AAD).

In some embodiments, Client C 1204 may receive the decrypted plaintext and the key ID from the cryptography service as a response to a decryption request. The client may further verify 1218 the received key ID against an expected key ID. The expected key ID may be the key ID associated with the expected sender. The client may determine the expected sender based on a protocol or other information. If the received key ID and the expected key ID do not match, an error may be raised and the purportedly protected message may be discarded as invalid. However, if the received key ID and the expected key ID match, the client may store and/or cache in memory the decrypted data key.

In some embodiments, Client C may receive a digitally signed payload (e.g., as part of the purported protected message). In some embodiments, the ECDH public key $Q_A$ may be used to verify a digital signature over the digitally signed payload 1008. In an embodiment, the public key $Q_A$ is included as part of an augmented AAD that is authenticated as part of a decryption operation. Upon authentication, the public key $Q_A$ may be used to verify 1220 the digital signature. If the digital signature is invalid, the purportedly protected message may be discarded as invalid. However, if the digital signature is valid, the encrypted message contained in the digitally signed payload may be decrypted 1222 using the data key obtained from the decryption of the authenticated payload. Upon completion of the decryption, the Client C obtains a plaintext message that has not been improperly modified.

Figure 13:
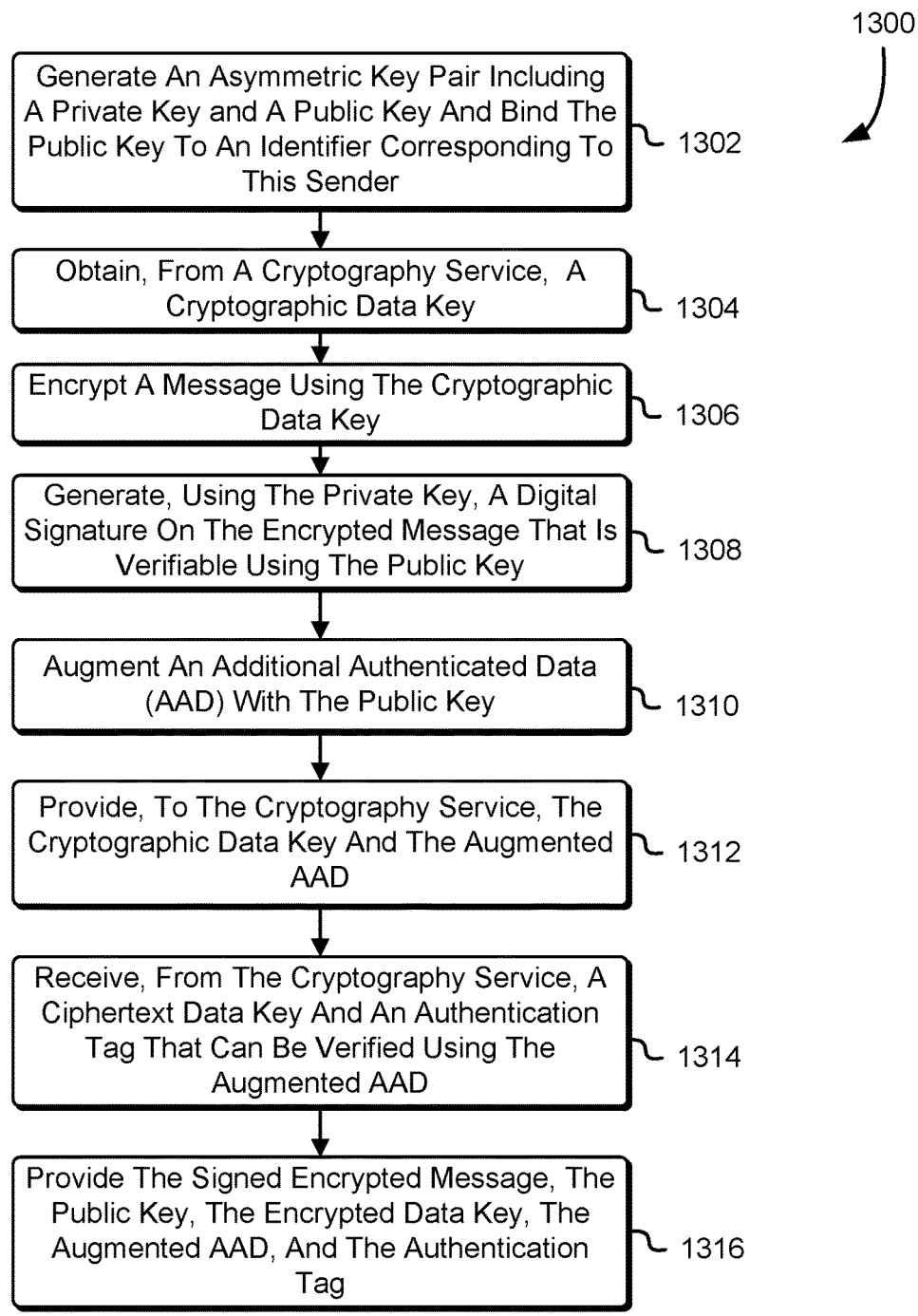
FIG. 13 shows an illustrative process for transmitting a cryptographically protected communication.

FIG. 13 shows an illustrative example of a process 1300 for generating a message protected under an enhanced envelope encryption scheme in accordance with an embodiment. The process 1300 may be performed by any suitable system such as computer systems described in accordance with client described above in FIGS. 8-12. In an embodiment, a system performing the process 1300 may generate 1302 an asymmetric key pair including a private key and a public key. In some embodiments, the asymmetric key pair may be an elliptic curve key pair. The system may also obtain 1304, from a cryptography service, a cryptographic data key that can be used for envelope encryption. The data key may be a symmetric key. In some embodiments, the data key may be obtained before the asymmetric key pair is generated.

In some embodiments, the data key may be used to encrypt 1306 a message. After encrypting the message, a digital signature may be generated 1308 over at least the encrypted message using the private key. In some embodiments, the public key may be used to verify the digital signature is authentic. The encryption and digital signature generation may be performed, for example, in accordance with embodiments described above in connection with FIGS. 9-10. In some embodiments, a digitally signed payload may include the ciphertext of the private key (in some embodiments, including metadata associated with the client master key used to perform the encryption) and the digital signature generated by the asymmetric private key.

In some embodiments, an additional authenticated data (AAD) may be obtained and the AAD may be augmented 1310 with the asymmetric public key. The AAD may be augmented, for example, by prepending or appending the asymmetric public key to the AAD. In some embodiments, the AAD may be a data structure and the asymmetric public key may be inserted or copied into a data element within the data structure. In some embodiments, the AAD may be optional and/or empty.

In some embodiments, the data key and the augmented AAD may be provided 1312 to the cryptography service as part of a request to perform an authenticated encryption. In some embodiments, the AAD may be optional, in which case the data key and asymmetric public key (or just the data key) may be provided to the cryptography service as part of a request to perform an authenticated encryption. The authenticated encryption may be performed by the cryptography service in accordance with embodiments described above in connection with FIGS. 9-10.

In some embodiments, (i.e., where the cryptography service successfully performed an authenticated encryption of the data key) the system of FIG. 13 may receive 1314, from the cryptography service, a ciphertext of the data key and an authentication tag that can be verified using the augmented AAD. In some embodiments, the AAD may be optional, in which case the asymmetric public key may be used to verify the authentication tag. In some embodiments, the system of FIG. 13 may transmit or provide 1316 a protected message including the ciphertext message, the digital signature, the ciphertext data key, augmented AAD, and authentication tag, for example, to another computer system. The system may make the protected message available, for example, by transmitting the protected message including the digitally signed payload and the authenticated to another client in one or more TCP packets.

Variations of the process 1300 described in FIG. 13 are also possible. In some embodiments, a system may augment an AAD with a public key, provide the augmented AAD to the cryptography service, and receive, from the cryptography service, a ciphertext data key and an authentication tag that can be verified using the augmented AAD. In such an embodiment, a plaintext data key may also be received from the cryptography service before, simultaneous with, or after receiving the ciphertext data key. In some embodiments, a system may receive the ciphertext data key, generate an authenticated payload including the ciphertext data key, authentication tag, AAD, and asymmetric public key. In some embodiments, after generating the authenticated payload, the system may obtain a cryptographic data key, generate a ciphertext of a first message using the data key, and digitally sign the ciphertext of the first message using the asymmetric private key. The system may make available a first protected message including the authenticated payload and a first digital payload based on the ciphertext of the first message in accordance with embodiments described above. The system may also generate a ciphertext of a second message using the data key and digitally sign the ciphertext of the second message using the asymmetric key. The system may then make available a second protected message including the same authenticated payload as the first message and a second digital payload based on the ciphertext of the second message in accordance with embodiments described above. As a result, in various embodiments, the system may generate multiple protected messages using the same authenticated payload.

Figure 14:
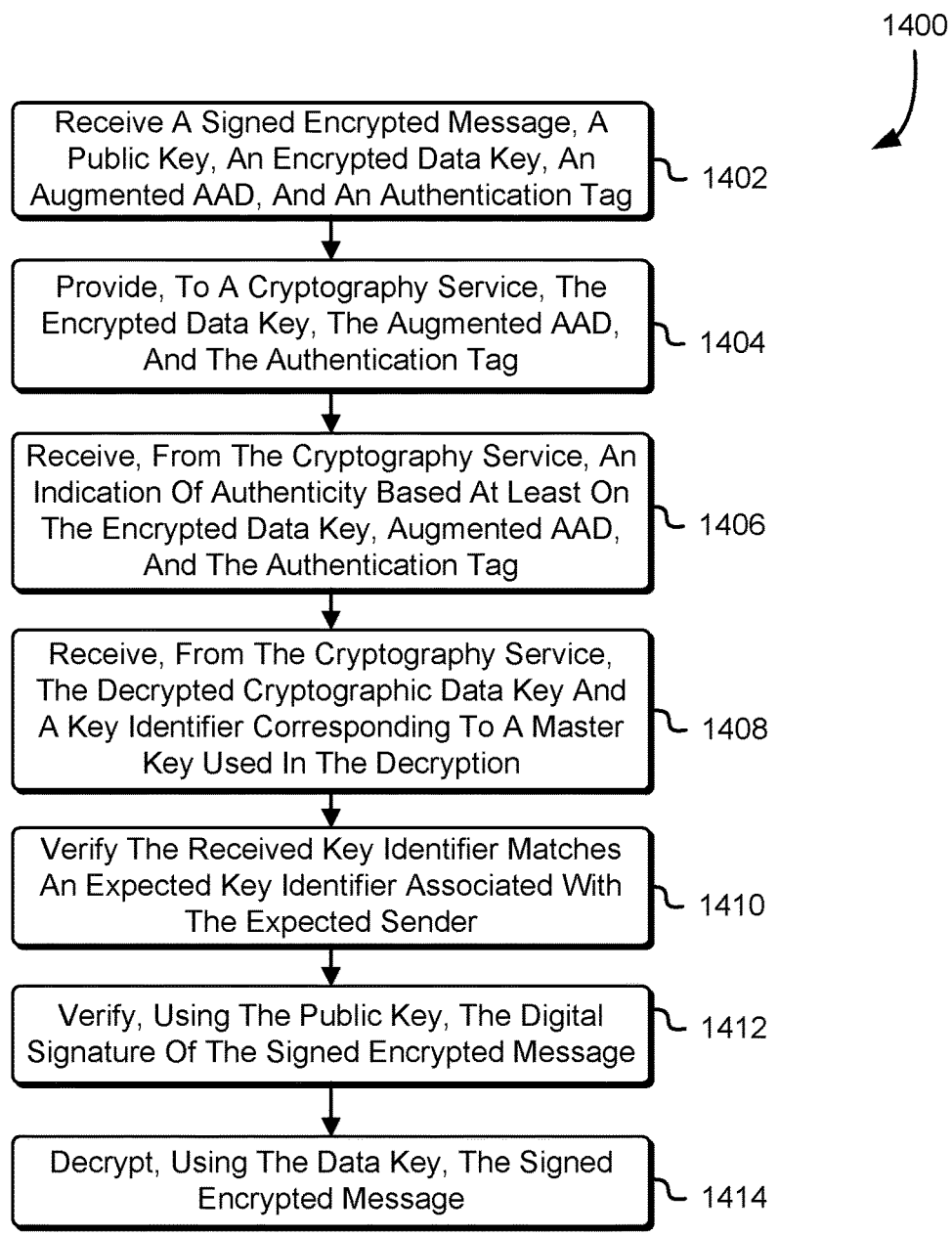
FIG. 14 shows an illustrative process for receiving and verifying a cryptographically protected communication.

FIG. 14 shows an illustrative example of a process 1400 for, in an embodiment, verifying a protected message has not been improperly modified. The process 1400 may be performed by any suitable system such as computer systems described in accordance with client described above in FIGS. 8-12. In an embodiment, a system performing the process 1400 may receive 1402 a protected message including a protected message that includes: a first ciphertext; a digital signature over the first ciphertext; a second ciphertext; an augmented AAD; and an authentication tag over the second ciphertext and augmented AAD. The protected message may have been improperly modified by the another computer system, or by another computing entity such as a router or switch involved in the transmission of the protected message.

In some embodiments, the system may provide 1404, to a cryptography service, the second ciphertext, augmented AAD, and authentication tag as part of a request (e.g., web API request) to decrypt the second ciphertext. The decryption may be performed by the cryptography service, for example, in accordance with embodiments described above in connection with FIGS. 9-10.

As part of a response to the request, the system may receive 1406, from the cryptography service, an indication of authenticity based at least on the second ciphertext, augmented AAD, and authentication tag. In some embodiments, such as those where the ciphertext, AAD, and/or authentication tag were modified during transmission, a failure or indication of invalidity may be received instead. The system may also receive 1408, as part of the response to the request, a plaintext of the second ciphertext and a key ID. The plaintext may include a cryptographic data key. The key ID may correspond to the client master key used by the cryptography service to decrypt the second ciphertext. In some embodiments, the indication of authenticity may be received after or simultaneous with when the plaintext and key ID are received. Note that the plaintext may still be in an obfuscated format (e.g., where multiple layers of encryption are applied to the data key).

In some embodiments, system may verify 1410 the received key ID matches the expected key identifier. The expected key ID may be the key ID associated with the expected sender. The client may determine the expected sender based on a protocol or other information. If the received key ID and the expected key ID do not match, an error may be raised and the protected message may be discarded as invalid. The system may perform this verification, for example, in accordance with embodiments described above in connection with FIGS. 9-10. In some embodiments, the system may decrypt, using the data key, the first plaintext and obtain a plaintext message that has not been improperly modified.

In some embodiments, the asymmetric public key may be used to verify 1412 the digital signature over the first ciphertext. In some embodiments, the digital signature may be verified before the indication of authenticity is received 1406 and/or before receiving the decrypted data key. After the second ciphertext has been decrypted and the data key obtained, the system may decrypt the first ciphertext using the data key and obtain a plaintext message. In some embodiments, the ciphertext may be decrypted before the indication of authenticity is received 1406 and/or before verifying the digital signature 1412. In such embodiments, the obtained plaintext message may be marked as unsafe to use until after the verification steps are completed successfully.

As used herein, the terms "private key" and "public key" may be used to refer, respectively, to private and public keys used as part of asymmetric cryptography ("public key cryptography"). Asymmetric cryptography refers to a class of cryptographic protocols wherein the private key and public key may be mathematically linked. In public key cryptography, there is no requirement that parties exchange a shared secret. Rather, a public key may be published and may be generally available (even to untrusted parties), whereas the private key should not be revealed to untrusted parties. The key pair (of the corresponding private key and public key) may be used to perform cryptographic operations. For example, a public key may be used to encrypt a plaintext message, resulting in a ciphertext, and the corresponding private key may be used to decrypt the ciphertext, resulting in the original plaintext message. As a second example, a private key may be used to generate a digital signature authenticating a message, and the corresponding public key may be used to verify that the digital signature is correct and thus, that the message is authentic.

Figure 15:
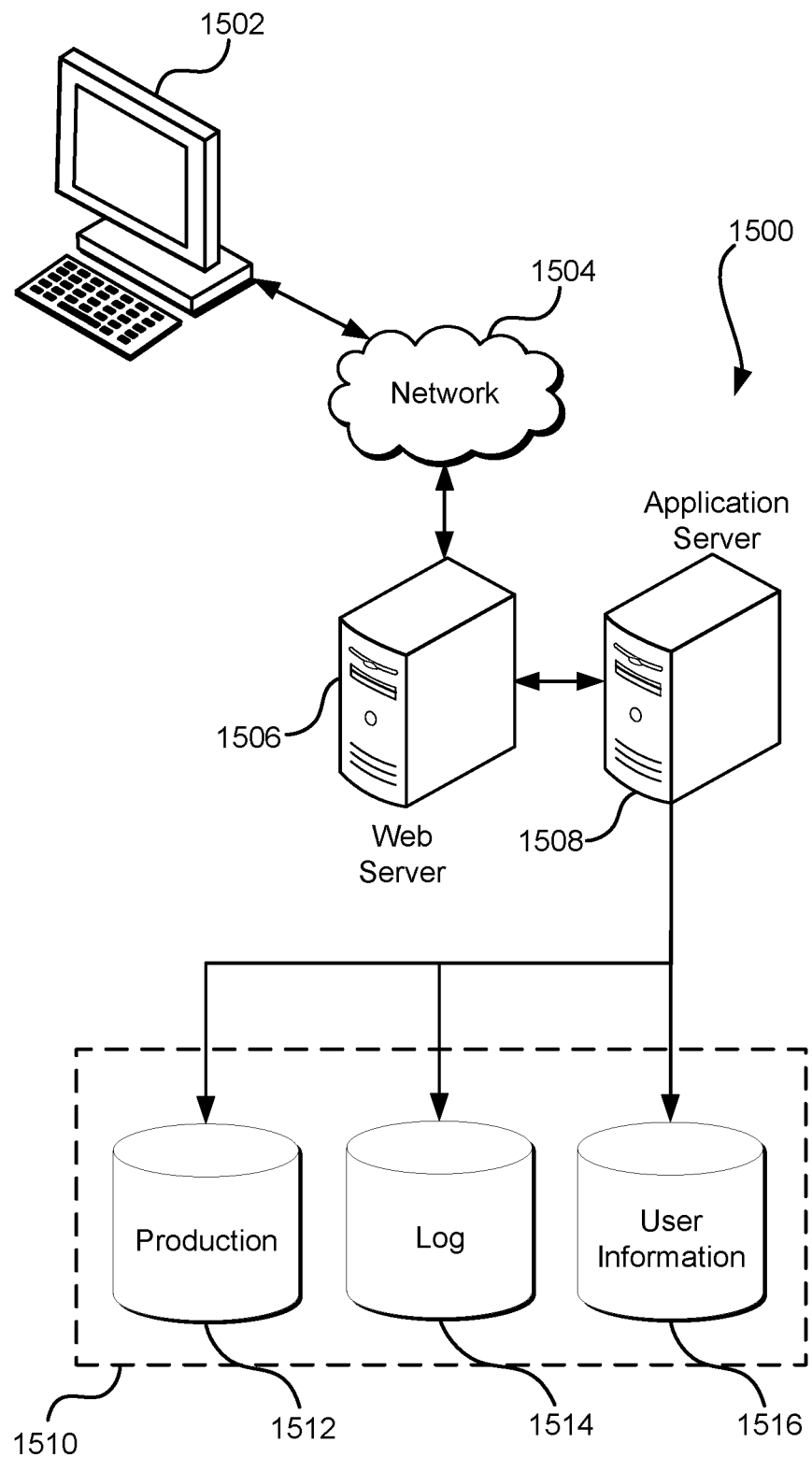
FIG. 15 illustrates an environment in which various embodiments can be implemented.

FIG. 15 illustrates aspects of an example environment 1500 for implementing aspects in accordance with various embodiments. As will be appreciated, although a web-based environment is used for purposes of explanation, different environments may be used, as appropriate, to implement various embodiments. The environment includes an electronic client device 1502, which can include any appropriate device operable to send and/or receive requests, messages, or information over an appropriate network 1504 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1502 and the application server 1508, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1510 can include several separate data tables, databases, data documents, dynamic data storage schemes and/or other data storage mechanisms and media for storing data relating to a particular aspect of the present disclosure. For example, the data store illustrated may include mechanisms for storing production data 1512 and user information 1516, which can be used to serve content for the production side. The data store also is shown to include a mechanism for storing log data 1514, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. The application server 1508 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1502. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   one or more computer processors; and
   memory that stores executable instructions that, as a result of being executed by the one or more processors, causes the system to:
   obtain, from a cryptography service, an indication a first binding between a first public key and a sender identity is authentic;
   provide to a client, as part of a handshake protocol, the first public key bound to the sender identity, and the indication that the first binding is authentic;
   receive from the client, a second public key;
   generate a shared secret using at least the second public key and a private key corresponding to the first public key, wherein the shared secret is unavailable to the cryptography service; and
   establish, using the shared secret, a cryptographically protected communication session with the client.

2. The system of claim 1, wherein:
   the second public key is bound, via a second binding, to a second sender identity and a second indication that is cryptographically verifiable by the cryptography service; and
   the instructions further cause the system to:
   verify, using the cryptography service, that the second binding is authentic; and
   generate the shared secret in response to successfully verifying that the second binding is authentic.

3. The system of claim 2, wherein:
   the system binds the first public key to the sender identity by at least generating a message that includes the first public key and the sender identity;
   the system obtains the indication that the first binding is authentic by obtaining a key identifier and requesting the cryptography service generate a Message Authentication Code (MAC) tag over the message using a cryptographic key associated with the key identifier;
   the second indication includes a second MAC tag; and
   the verifying that the second binding is authentic comprises providing, to the cryptography service, the second MAC tag, and the second binding.

4. The system of claim 2, wherein:
   the system binds the first public key to the sender identity includes generating a message that includes the first public key and the sender identity;
   the system obtains the indication that the first binding is authentic by obtaining a key identifier and requesting the cryptography service encrypt the message using a cryptographic key associated with the key identifier;
   the second indication includes a ciphertext; and
   the system further includes instructions, for verifying that the second binding is authentic, to:
   provide, to the cryptography service, the ciphertext to decrypt;
   receive, from the cryptography service, a plaintext corresponding to ciphertext and a second key identifier; and
   determine the second key identifier is associated to the client.

5. The system of claim 4, wherein:
   the message further includes a nonce; and
   the system further includes instructions, for verifying the second binding is authentic, to determine the plaintext corresponding to the ciphertext includes the nonce.

6. The system of claim 1, wherein the first public key and the private key form an elliptic curve key pair comprising an elliptic curve public key $Q_A$, and a corresponding elliptic curve private key $d_A$, and the second public key is an elliptic curve public key $Q_B$, and wherein the shared secret is generated based in part on calculating an elliptic curve point multiplication of $d_A$ and $Q_B$.

7. The system of claim 1, wherein the instructions further cause the system to, after establishing the cryptographically protected communication session, obtain data, generate a digital signature over the data using the private key, and transmit to the client, via the cryptographically protected communication session, the data and the digital signature.

8. The system of claim 1, wherein the cryptographically protected communication session is a Transport Layer Security (TLS) session.

9. A computer-implemented method comprising:
   under the control of one or more computer systems configured with executable instructions,
   obtaining, from a cryptography service, an indication a first binding between a first public key and a sender identity is authentic;
   providing to a client, as part of a handshake protocol, the first public key bound to the sender identity, and the indication that the first binding is authentic;
   receiving from the client, a second public key;
   generating a shared secret using at least the second public key and a private key corresponding to the first public key, wherein the shared secret is unavailable to the cryptography service; and
   establishing, using the shared secret, a cryptographically protected communication session with the client.

10. The computer-implemented method of claim 9, wherein the first public key and the private key form an elliptic curve key pair comprising an elliptic curve public key $Q_A$, and a corresponding elliptic curve private key $d_A$, and the second public key is an elliptic curve public key $Q_B$, and wherein the shared secret is generated based in part from calculating an elliptic curve point multiplication of $d_A$ and $Q_B$.

11. The computer-implemented method of claim 9, wherein:
   the second public key is bound, via a second binding, to a second sender identity and a second indication that is cryptographically verifiable by the cryptography service; and
   the method further comprises:
   verifying, using the cryptography service, that the second binding is authentic; and generating the shared secret in response to successfully verifying that the second binding is authentic.

12. The computer-implemented method of claim 11, wherein:
the method further comprises causing the computer system to at least bind the first public key to the sender identity by at least generating a message that includes the first public key and the sender identity;
obtaining the indication that the first binding is authentic comprises obtaining a key identifier and requesting the cryptography service generate a Message Authentication Code (MAC) tag over the message using a cryptographic key associated with the key identifier;
the second indication includes a second MAC tag; and
the verifying that the second binding is authentic comprises providing, to the cryptography service, the second MAC tag, and the second binding.

13. A non-transitory computer-readable storage medium having stored thereon executable instructions that, as a result of being executed by one or more processors of a computer system, cause the computer system to at least:
obtain, from a cryptography service, an indication a first binding between a first public key and a sender identity is authentic;
provide to a client, as part of a handshake protocol, the first public key bound to the sender identity, and the indication that the first binding is authentic;
receive from the client, a second public key;
generate a shared secret using at least the second public key and a private key corresponding to the first public key, wherein the shared secret is unavailable to the cryptography service; and
establish, using the shared secret, a cryptographically protected communication session with the client.

14. The non-transitory computer-readable storage medium of claim 13, wherein:
the second public key is bound, via a second binding, to a second sender identity and a second indication that is cryptographically verifiable by the cryptography service; and
the executable instructions further cause the computer system to at least:
verify, using the cryptography service, that the second binding is authentic; and
generate the shared secret in response to successfully verifying that the second binding is authentic.

15. The non-transitory computer-readable storage medium of claim 14, wherein:
the executable instructions further cause the computer system to at least:
bind the first public key to the sender identity by at least generating a message that includes the first public key and the sender identity; and
obtain the indication that the first binding is authentic by obtaining a key identifier and requesting the cryptography service generate a Message Authentication Code (MAC) tag over the message using a cryptographic key associated with the key identifier;
the second indication includes a second MAC tag; and
the verifying that the second binding is authentic comprises providing, to the cryptography service, the second MAC tag, and the second binding.

16. The non-transitory computer-readable storage medium of claim 14, wherein:
the executable instructions further cause the computer system to at least:
bind the first public key to the sender identity includes generating a message that includes the first public key and the sender identity; and
obtain the indication that the first binding is authentic by obtaining a key identifier and requesting the cryptography service encrypt the message using a cryptographic key associated with the key identifier;
the second indication includes a ciphertext; and
the executable instructions for verifying that the second binding is authentic further cause the computer system to at least:
provide, to the cryptography service, the ciphertext to decrypt;
receive, from the cryptography service, a plaintext corresponding to ciphertext and a second key identifier; and
determine the second key identifier is associated to the client.

17. The non-transitory computer-readable storage medium of claim 16, wherein:
the message further includes a nonce; and
the executable instructions for verifying the second binding is authentic further cause the computer system to at least determine the plaintext corresponding to the ciphertext includes the nonce.

18. The non-transitory computer-readable storage medium of claim 16, wherein the encryption request is an authenticated encryption request.

19. The non-transitory computer-readable storage medium of claim 13, wherein the first public key and the private key form an elliptic curve key pair comprising an elliptic curve public key $Q_A$, and a corresponding elliptic curve private key $d_A$, and the second public key is an elliptic curve public key $Q_B$, and wherein the shared secret is generated based in part from calculating an elliptic curve point multiplication of $d_A$ and $Q_B$.

20. The non-transitory computer-readable storage medium of claim 13, wherein the executable instructions further cause the computer system to at least, after establishing the cryptographically protected communication session, obtain data, generate a digital signature over the data using the private key, and transmit to the client, via the cryptographically protected communication session, the data and the digital signature.

* * * * *